(12) United States Patent
Miyasako et al.

(10) Patent No.: US 7,275,525 B2
(45) Date of Patent: Oct. 2, 2007

(54) CONTROL APPARATUS FOR AN INTERNAL COMBUSTION ENGINE

(75) Inventors: Masakazu Miyasako, Tokyo (JP); Koji Wada, Tokyo (JP); Motoyasu Suenaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 24 days.

(21) Appl. No.: 11/367,273

(22) Filed: Mar. 6, 2006

(65) Prior Publication Data

US 2007/0062499 A1  Mar. 22, 2007

(30) Foreign Application Priority Data

Sep. 21, 2005  (JP) ............... 2005-274005

(51) Int. Cl.
*F02M 25/07* (2006.01)
*F02B 47/08* (2006.01)
*G06F 19/00* (2006.01)
*G01M 19/00* (2006.01)

(52) U.S. Cl. ............... 123/568.16; 701/108; 73/118.1

(58) Field of Classification Search ............ 123/568.11, 123/568.16, 568.21, 585, 493; 701/108, 701/110, 114; 60/605.2; 73/117.3, 118.1, 73/118.2

See application file for complete search history.

(56) References Cited

U.S. PATENT DOCUMENTS

| | | | | |
|---|---|---|---|---|
| 5,368,005 A | * | 11/1994 | Kako | ............ 123/568.16 |
| 5,488,938 A | * | 2/1996 | Ohuchi | ............ 123/568.16 |
| 5,513,616 A | * | 5/1996 | Matsumoto et al. | ... 123/568.16 |
| 5,542,400 A | * | 8/1996 | Matsumoto et al. | ... 123/568.16 |
| 7,104,259 B2 | * | 9/2006 | Terada | ............ 123/568.16 |

FOREIGN PATENT DOCUMENTS

| | | |
|---|---|---|
| JP | 08-028364 A | 1/1996 |
| JP | 08-035449 A | 2/1996 |

\* cited by examiner

*Primary Examiner*—Willis R. Wolfe, Jr.
(74) *Attorney, Agent, or Firm*—Sughrue Mion Pllc.

(57) ABSTRACT

A control apparatus for an internal combustion engine can compensate for a variation of intake pressure resulting from various factors whereby a failure detection area can be expanded, and false detection can be prevented to enable failure determination for an EGR system with high reliability. The apparatus determines whether a vehicle is decelerating, forcedly opens and closes an EGR valve, and determines whether an EGR control device is in failure by comparing a pressure change index value based on intake pressures upon the forced opening and closing of the EGR valve with a failure determination value. The apparatus adjusts the intake pressure to a predetermined state before the EGR valve is forcedly opened and closed, whereby a failure determination can be always made based on the intake pressure whose variation was compensated for with the intake pressure becoming a predetermined characteristic to the number of revolutions per minute of the engine.

7 Claims, 12 Drawing Sheets

CONTROL APPARATUS FOR AN INTERNAL COMBUSTION ENGINE

BACKGROUND OF THE INVENTION

1. Field of the Invention

The present invention relates to a control apparatus for an internal combustion engine (hereinafter referred to as an engine) equipped with a failure detection device for an exhaust gas recirculation control system (EGR system), and more particularly, it relates to a new technique that is capable of preventing the false detection of failure of such an EGR system.

2. Description of the Related Art

In the past, in engine control apparatuses mounted on motor vehicles or the like, there have been proposed a variety of exhaust gas recirculation (EGR) control devices in which a part of an exhaust gas is recirculated into an intake pipe of an engine so as to reduce the combustion temperature of the engine thereby to suppress NOx components in the exhaust gas (see, for instance, a first patent document (Japanese patent application laid-open No. H8-28364) and a second patent document (Japanese patent application laid-open No. H8-35449)).

FIG. 8 is a constructional view that schematically illustrates the entire system of a general control apparatus for an internal combustion engine as described, for example, in the first patent document or the second patent document.

In FIG. 8, an EGR control device includes an engine 1, an air cleaner 2, an intake pipe 3, an intake manifold 4, an injector 5, a pressure sensor 6 for detecting the pressure Pb (negative pressure) in the intake pipe 3, a throttle valve 7 for controlling the amount of intake air Qa, a throttle opening sensor 8 for detecting the throttle opening θ of the throttle valve 7, a bypass air amount control section (ISC solenoid) 9, an air flow meter 10 for detecting the amount of intake air Qa, an EGR tube 11, an EGR valve 12 disposed in the EGR tube 11, an EGR opening sensor 13 for detecting the degree of opening θe of the EGR valve 12 (EGR opening θe), an angle sensor 14 for detecting the rotational angle of the engine 1, an exhaust pipe 15, a catalyst 16 disposed in the exhaust pipe 15 for purifying the exhaust gas flowing therein, a water temperature sensor 17, an idle switch 18, an air conditioning switch 19 for generating an air conditioner turn-on signal A, an air conditioner controller 19A for driving an air conditioner by the air conditioner control signal D, a battery 20, an ignition key switch 21, and an electronic control unit 22.

The pressure sensor 6, the throttle opening sensor 8, the EGR opening sensor 13, the angle sensor 14, the water temperature sensor 17, the idle switch 18, the air conditioning switch 19 and so on together constitute a sensor part that provides the operating condition information of the engine 1.

The electronic control unit 22 takes in the operating condition information (the throttle opening θ, the degree of EGR opening θe, an engine rotation angle rad (the number of revolutions per minute of the engine Ne), an idle signal I, the intake pipe pressure Pb, the amount of intake air Qa, a cooling water temperature Tw, the air conditioner turn-on signal A, etc.) from the sensor part, and controls the amount of fuel to be injected from the injector 5, the flow rate of EGR gas Qe (hereinafter referred to simply as the flow rate of EGR Qe), the amount of bypass air Qb, and the operation of the air conditioner in accordance with the operating condition information.

That is, the electronic control unit 22 includes a fuel control section related to the injector 5, an EGR control section related to the EGR valve 12, and an EGR failure determination section, and outputs a fuel injection control signal J to the injector 5, an EGR control signal C to the EGR valve 12, a bypass control signal B to the bypass air amount control section 9, an air conditioner control signal D to the air conditioner controller 19A, etc.

In the known device illustrated in FIG. 8, the electronic control unit 22 maintains a demanded output (a target number of revolutions per minute) during idling (throttle closed) operation by controlling the amount of bypass air Ob by means of the bypass air amount control section 9. In addition, when the cooling water temperature Tw is below a predetermined temperature (engine cooling state), or when the engine is loaded, e.g., during the operation of the air conditioner, the engine operates to ensure the demanded output by increasing the amount of intake air Qa under the control of the bypass air amount control section 9.

The amount of bypass air Qb changes in accordance with the intake pipe pressure Pb that is changed by the number of revolutions per minute of the engine Ne, etc., even if the passage area of the ISC solenoid (or the throttle valve 7) of the bypass air amount control section 9 is constant.

Moreover, for example, if the air conditioner turn-on signal A indicates an on (turn-on) command and the operating condition satisfies an air conditioner turn-on permission condition, an engine load driving section in the electronic control unit 22 generates an air conditioner control signal D for actuating the air conditioner, whereas if the air conditioner turn-on signal A indicates an off command, the engine load driving section generates an air conditioner control signal D for deactuating the air conditioner, whereby the turn-on or actuation of the air conditioner is controlled so as to give priority to ensuring the operating condition of the engine while preventing an excessively large load thereon.

However, the required flow rate of EGR gas might not sometimes be obtained due to defective operation of the EGR valve 12, the accumulation of exhaust gas deposits on the EGR valve 12 and/or the EGR tube 11 in accordance with the age of use. If such a state is left, there will arise a problem that a large amount of NOx continues to be generated, but such an abnormal flow rate of EGR of the exhaust gas can not be easily found or recognized by the driver.

Accordingly, as a failure detection device for such an EGR control section (EGR system), there has been proposed one that makes a failure determination based on an amount of change (pressure difference ΔP) in the intake pipe pressure in accordance with the change of the amount of intake air Qa due to the presence and absence of EGR when the EGR valve 12 is forced to open and/or close.

However, when the EGR valve 12 is opened and/or closed during the steady-state operation of the engine 1, the torque generated by the engine 1 is varied, thereby deteriorating the driveability of the vehicle.

Accordingly, in the above-mentioned first and second patent documents, the generated torque of the engine 1 is eliminated to prevent the deterioration of drivability by opening and/or closing the EGR valve 12 when the engine operating condition is a fuel cut-off operation (fuel supply stop) during deceleration.

Next, reference will be made to the operation of the above-mentioned known control apparatus for an internal combustion engine constructed as shown in FIG. 8 by taking, as an example, a case in which failure detection of the EGR system in a deceleration state is carried out.

In this case, first of all, the number of revolutions per minute of the engine Ne is more than or equal to a predetermined value and the throttle valve 7 is in a fully closed state (the idle signal I being in an on state), so a determination is made that the vehicle is in a deceleration state (the failure determination condition being satisfied), and the EGR valve 12 is fully closed to put the engine 1 into a non-EGR operation state, while storing the value of the intake pipe pressure PbOFF at this time.

Subsequently, the EGR valve 12 is forced to open thereby to put the engine into an EGR operation state (EGR gas being introduced), and the value of the intake pipe pressure PbON at this time is stored.

In addition, a pressure difference ΔP between the intake pipe pressure PbON in the presence of EGR and the intake pipe pressure PbOFF in the absence of EGR is calculated according to the following expression (1).

$$\Delta P = PbON - PbOFF \tag{1}$$

Thereafter, the pressure difference ΔP thus obtained is compared with a predetermined value (fail), which is a lower limit value of a normal pressure difference, and when ΔP≧fail, the pressure difference ΔP is normal (the EGR gas being in a normally introduced state) and hence it is determined that the EGR system is normal.

On the other hand, when ΔP<fail (that is, NO), the pressure difference ΔP has not yet reached the lower limit value of the normal pressure difference (the introduction of the EGR gas being not performed normally), so it is determined that the EGR control section, which constitutes the EGR system, is abnormal.

In general, the intake pipe pressure Pb with the EGR valve 12 being fully closed (in the absence of EGR) is about 35 kPa, whereas the intake pipe pressure Pb when the EGR gas is forcedly introduced with the EGR valve 12 being fully opened (in the presence of EGR) reaches about 60 kPa.

Accordingly, in order to distinguish the normal value (e.g., 25 kPa) of the pressure difference ΔP from abnormal ones, the predetermined value (fail) is set to about 10 kPa, for instance.

Here, reference will be made to the influence on the pressure difference ΔP resulting from a difference between deceleration states such as rapid deceleration and slow deceleration, while referring to a timing chart in FIG. 9 and a characteristic view in FIG. 10.

FIG. 9 is a timing chart that shows the relation between a deceleration flag, an EGR flag (the presence or absence of EGR), the number of revolutions per minute of the engine Ne and the intake pipe pressure Pb as well as the changes thereof over time, while illustrating the operation of the engine when the above-mentioned failure detection operation is carried out during deceleration with the EGR system being normal.

In the curves of the number of revolutions per minute of the engine Ne and the intake pipe pressure Pb in FIG. 9, solid lines represent changes over time in a slow deceleration state, and broken lines represent changes over time in a rapid deceleration state, respectively.

In FIG. 9, intake pipe pressures Pb in the presence and absence of EGR are stored at time points t1, t2 in a failure detection period TA (a valid period in which the failure determination condition is satisfied).

That is, an intake pipe pressure PbOFF1 in the absence of EGR and an intake pipe pressure PbON1 in the presence of EGR are stored at time points t1, t2, respectively, during slow deceleration (solid line) in FIG. 9.

Similarly, during rapid deceleration (broken line), an intake pipe pressure PbOFF2 in the absence of EGR and an intake pipe pressure PbON2 in the presence of EGR are stored at time points t1, t2, respectively.

FIG. 10 is a characteristic view that shows the relation between the number of revolutions per minute of the engine Ne [r/min] and the intake pipe pressure Pb [kPa], in which a solid line represents a case in the absence of EGR, and a broken line represents a case in the presence of EGR, respectively.

In FIG. 10, points b1, b2 on the broken line (a characteristic curve with EGR) and points c1, c2 on the solid line (a characteristic curve without EGR) are shown in association with point a on the solid line before the execution of EGR (a characteristic curve without EGR).

Point b1 on the broken line represents a point that is shifted from the point a on the solid line to the broken line when the change in the number of revolutions per minute of the engine Ne is small, and point c1 on the solid line represents a point on the solid line when the number of revolutions per minute of the engine Ne is equal to the point b1.

Point b2 on the broken line represents a point that is shifted from the point a on the solid line to the broken line when the change in the number of revolutions per minute of the engine Ne is large, and point c2 on the solid line represents a point on the solid line when the number of revolutions per minute of the engine Ne is equal to the point b2.

In FIG. 9, first of all, the decreasing speed of the number of revolutions per minute of the engine Ne is slow or gradual during slow deceleration (see the solid line), and the change in the number of revolutions per minute of the engine Ne in a failure detection period TA is small.

At this time, when EGR is forcedly carried out, the intake pipe pressure Pb shifts from the point a on the characteristic curve of the solid line (in the absence of EGR) in FIG. 10 to the point b1 on the characteristic curve of the broken line (in the presence of EGR), so a pressure difference ΔP (=Pb(b1)−Pb(a)) is obtained.

On the other hand, during rapid deceleration (see the broken line in FIG. 9), the decreasing speed of the number of revolutions per minute of the engine Ne is rapid, and the change in the number of revolutions per minute of the engine Ne in the failure detection period TA is large.

At this time, when EGR is forcedly carried out, the intake pipe pressure Pb shifts from the point a on the characteristic curve of the solid line (in the absence of EGR) in FIG. 10 to the point b2 on the characteristic curve of the broken line (in the presence of EGR), so a pressure difference ΔP'(=Pb(b2)−Pb(a)) is obtained.

Here, note that each of the individual pressure differences ΔP, ΔP' contains a change component ΔP(EGR) resulting from the execution of EGR and a change component ΔP(Ne) resulting from the change in the number of revolutions per minute of the engine Ne.

Here, it is understood from the characteristic view of FIG. 10 that the curvature of each of the characteristic curves of the solid line (in the absence of EGR) and the broken line (in the presence of EGR) changes in accordance with the number of revolutions per minute of the engine Ne.

In other words, it is found that in the individual pressure differences ΔP (=Pb (b1)−Pb(a)) and ΔP'(=Pb(b2)−Pb(a)) at slow deceleration and rapid deceleration, the change components ΔP(Ne) contained in the individual pressure differences ΔP, ΔP', respectively, resulting from the number of revolutions per minute of the engine Ne are different from each other even if the degree of EGR opening θe in the presence of EGR is constant.

In other words, the detected value of the pressure difference ΔP might vary depending on the difference of the deceleration state (rapid deceleration or slow deceleration).

Accordingly, when a determination is made as to whether the EGR control device is in failure, by detecting the pressure difference ΔP according to the change in the amount of intake air Qa due to the presence and absence of EGR in the deceleration state, it might become, in the worst case, unable to detect the failure state of the EGR control device, or the normal state thereof might be mistakenly detected as a failure state thereof.

In order to cope with this, in the above-mentioned first patent document, the pressure change index value is further corrected by reading out the change ΔP(Ne) resulting from the change in the number of revolutions per minute of the engine Ne during deceleration as a correction function f based on the number of revolutions per minute of the engine Ne at the time point of detection of the intake pipe pressure Pb.

Next, reference will be made to the operation of controlling the amount of bypass air during deceleration according to the above-mentioned first patent document while referring to a timing chart in FIG. 11, with emphasis being focused on the operation of the bypass air amount control section 9.

FIG. 11 shows the relation among the deceleration flag indicating whether the engine is decelerated or not, the throttle opening θ, and the amount of bypass air Qb together with their changes over time.

In FIG. 11, the solid lines represent characteristics in the case of a throttle opening θA and the alternate long and short dash lines represent characteristics in the case of a throttle opening θB (<θA).

First of all, when the vehicle is traveling with the deceleration flag being "0" (the idle switch 18 being turned off, i.e., the vehicle being not under deceleration), the amount of bypass air Qb is controlled to an amount corresponding to the throttle opening θ.

On the other hand, from a time point t0 at which the deceleration flag is shifted to "1" (the idle switch 18 being turned on, i.e., the vehicle being under deceleration), the amount of bypass air Qb is calculated at predetermined time intervals according to the following expression (2) by using the current amount of bypass air Qbn, the last amount of bypass air Qbn−1 and a predetermined value β.

$$Qbn=Qbn-1-\beta \qquad (2)$$

By executing the calculation of the above expression (2), the amount of bypass air Qb is gradually decreasing, as shown in FIG. 11. Such a decreasing operation of the amount of bypass air Qb is referred to as a so-called dashpot operation.

Also, at the time of the operation of the engine load (air conditioner), the electronic control unit 22 outputs an air conditioner control signal D to the air conditioner controller 19A thereby to put the air conditioner in operation, and the bypass air amount control section 9 increases the amount of intake air Qa thereby to ensure the demanded or required output of the engine 1.

Similarly, the bypass air amount control section 9 ensures the demanded engine output by increasing the amount of bypass air Qb in a cooling state of the engine 1.

As a result, even during deceleration (the throttle valve 7 being in the fully closed state), the amount of bypass air Qb might be changed to vary the intake pipe pressure Pb.

Here, reference will be made to an influence on the detected value of the pressure difference ΔP resulting from the change in the amount of bypass air Qb while referring to FIG. 12.

FIG. 12 is a characteristic view when measurements were made in a no-load state and in a complete warm-up state of the engine, respectively, wherein there are shown the relation between the number of revolutions per minute of the engine Ne and the intake pipe pressure Pb in the presence or absence of EGR and the relation between the number of revolutions per minute of the engine Ne and the pressure difference ΔP due to the presence and absence of EGR.

In the relation between the number of revolutions per minute of the engine Ne and the intake pipe pressure Pb in FIG. 9 (see an upper graph), a solid line characteristic curve WA shows the relation between the number of revolutions per minute of the engine Ne and the intake pipe pressure Pb in the absence of EGR with the area of the bypass air passage being α, and a solid line characteristic curve WB shows the relation between the number of revolutions per minute of the engine Ne and the intake pipe pressure Pb in the absence of EGR with the area of the bypass air passage being β (>α).

As is clear from the individual characteristic curves WA, WB, the intake pipe pressure Pb becomes higher in accordance with the decreasing number of revolutions per minute of the engine Ne, whereas the curvatures of the individual characteristic curves WA, WB tend to be different from each other in accordance with the number of revolutions per minute of the engine Ne.

Further, when a comparison is made while focusing on the same number of revolutions per minute of the engine Ne, the intake pipe pressure Pb becomes higher in the case of the characteristic curve WB of the bypass air passage area β(>α) than in the case of the characteristic curve WA of the bypass air passage area α.

In addition, in FIG. 12, a broken line characteristic curve WC shows the relation between the number of revolutions per minute of the engine Ne and the intake pipe pressure Pb in the presence of EGR (the degree of EGR opening θe being constant) with the area of the bypass air passage being α, and a solid line characteristic curve WD shows the relation between the number of revolutions per minute of the engine Ne and the intake pipe pressure Pb in the presence of EGR (the degree of EGR opening θe being constant) with the area of the bypass air passage being β.

The characteristic curves WC, WD in the presence of EGR (broken lines) are higher in the intake pipe pressure Pb than the characteristic curves WA, WB in the absence of EGR (solid lines).

Moreover, as is clear from the characteristic curves WC, WD, similar to the case in the absence of EGR (solid lines), the lower the number of revolutions per minute of the engine Ne, and the larger the bypass air passage area, higher does the intake pipe pressure Pb become, so the curvature is varied in accordance with the number of revolutions per minute of the engine Ne.

On the other hand, in the relation between the number of revolutions per minute of the engine Ne and the pressure difference ΔP due to the presence and absence of EGR in FIG. 12 (see a lower graph), a solid line characteristic curve WE shows the relation between the number of revolutions per minute of the engine Ne with the area of the bypass air passage being α and the pressure difference ΔP (characteristic curve WC-WA) due to the presence and absence of EGR, and an alternate long and two short dashes line characteristic curve WF shows the relation between the number of revolutions per minute of the engine Ne with the area of the bypass air passage being β and the pressure difference ΔP (characteristic curve WD-WB) due to the presence and absence of EGR.

In the characteristic curves WA through WD (for the relation between the number of revolutions per minute of the engine Ne and the intake pipe pressure Pb), the curvatures (for characteristic curves WA, WC and characteristic curves WB, WD) with respect to the number of revolutions per minute of the engine Ne are different from one another according to the presence or absence of EGR, so in the characteristic curves WE, WF (for the relation between the number of revolutions per minute of the engine Ne and the pressure difference ΔP), the lower the number of revolutions per minute of the engine Ne, the larger does the pressure difference ΔP become.

Further, the curvatures of the characteristic curves WA through WD (the characteristic curves WA, WB and the characteristic curves WC, WD) with respect to the number of revolutions per minute of the engine Ne are different from one another according to the magnitude (α<β) of the bypass air passage areas α, β, so the characteristic curves WE, WF (the relation between the number of revolutions per minute of the engine Ne and the pressure difference ΔP) are different from each other according to the magnitude of the bypass air passage areas α, β.

In FIG. 12, a solid line E (the bypass air passage area α) represents a characteristic curve when a target amount of bypass air is fixed to 115 [L(liter)/min], and an alternate long and two short dashes line F (the bypass air passage area β) represents a characteristic curve when the target amount of bypass air is fixed to 260 [L/min].

In the relation between the number of revolutions per minute of the engine Ne and the pressure difference ΔP, the pressure difference ΔP becomes larger by about 1 kPa when the target amount of bypass air is fixed to 260 [L/min] (the alternate long and two short dashes line F) than when the target amount of bypass air is fixed to 115 [L/min] (the solid line E).

Thus, when the area of the bypass air passage (the amount of bypass air) varies, a difference is generated in the pressure difference ΔP between the intake pipe pressures Pb in the presence and absence of EGR.

Accordingly, even if the change ΔP(Ne) according to the change in the number of revolutions per minute of the engine Ne at the time of deceleration is corrected based on the number of revolutions per minute of the engine Ne at the time point of detection of the intake pipe pressure Pb, there is a possibility that the detected value of the pressure difference ΔP might be varied when the intake pipe pressure Pb varies resulting from the change in the amount of bypass air Qb due to the bypass air amount control section 9, as stated above.

As a result, in a device that makes a failure determination based on the amount of change of the intake pipe pressure Pb (the pressure difference ΔP) according to the change in the amount of intake air Qa due to the presence and absence of EGR, there is a possibility, in the worst case, of becoming unable to detect a failure state or of mis-detecting a normal state as a failure state.

Accordingly, in the above-mentioned second patent document, the intake pipe pressure Pb detected upon the forced opening and closing of the EGR valve is corrected by using the number of revolutions per minute of the engine Ne and the amount of bypass air Qb detected upon the forced opening and closing of the EGR valve, and an EGR rate equivalent value PEGR (corresponding to the flow rate of EGR Qe) is calculated from the intake pipe pressure thus corrected, whereby a failure of the EGR control device is detected based on the EGR rate equivalent value PEGR.

Hereinafter, reference will be made to the correction processing using the number of revolutions per minute of the engine Ne and the amount of bypass air Qb as well as the failure detection processing using the EGR rate equivalent value PEGR according to the above-mentioned second patent document.

In this case, in comparison with the processing section of the above-mentioned first patent document, there are added a correction section for correcting the intake pipe pressure Pb in accordance with the change in the number of revolutions per minute of the engine Ne, a correction section for correcting the intake pipe pressure Pb in accordance with the change in the amount of bypass air Qb, a calculation section for calculating the EGR rate equivalent value PEGR, and an error suppression section for suppressing an error of the intake pipe pressure Pb based on the EGR rate equivalent value PEGR.

Here, note that in order to compensate for the influence due to an increased amount of bypass air Qb in the cooling state of the engine 1, a failure determination is not executed in a temperature range in which the amount of bypass air Qb increases (e.g., the cooling water temperature Tw being equal to or lower than 80° C.).

First of all, when it is determined that the engine 1 is under deceleration, the EGR valve 12 is fully closed to put the engine 1 into a non-EGR operation state, and the values of the intake pipe pressure PbOFF, the number of revolutions per minute of the engine NeOFF and the amount of bypass air QbOFF at this time are stored.

Subsequently, the EGR valve 12 is fully opened to put the engine 1 into an EGR operation state (the EGR gas being introduced), and the value of the intake pipe pressure PbON and the number of revolutions per minute of the engine NeOFF at this time are stored.

Then, a pressure difference after correction (hereinafter referred to as a corrected pressure difference) ΔPf is calculated by using the pressure difference ΔP between the intake pipe pressure PbON in the presence of EGR and the intake pipe pressure PbOFF in the absence of EGR, and the correction function f based on the numbers of revolutions per minute of the engine NeON, NeOFF in the presence and absence of EGR, as shown by the following expression (3).

$$\Delta Pf = \Delta P - \{f(NeON) - f(NeOFF)\} \quad (3)$$

Subsequently, the EGR rate equivalent value PEGR is calculated by using the corrected pressure difference ΔPf calculated from expression (3) above and the intake pipe pressure PbOFF in the absence of EGR.

At this time, the EGR rate equivalent value PEGR is calculated by using the intake pipe pressure corrected by a correction function g based on the number of revolutions per minute of the engine NeOFF and the amount of bypass air QbOFF in the absence of EGR, as shown by the following expression (4).

$$PEGR = [\Delta Pf / \{PbOFF - g(NeOFF, QbOFF)\}] \times 100 \quad (4)$$

By correcting an error in the EGR rate equivalent value PEGR due to the change in the amount of bypass air Qb according to the above-mentioned processing, reliability in the failure detection of the EGR control device is improved.

Thereafter, normality or abnormality of the EGR system is determined based on whether the EGR rate equivalent value PEGR is higher than or equal to a threshold value PEGR(fail).

As described above, in the known EGR system failure detection device disclosed in the above-mentioned first patent document, there is used the correction section that reads the error of the pressure difference ΔP, which results from the change in the number of revolutions per minute of the engine Ne due to the difference of the deceleration state, as the correction function f based on the number of revolutions per minute of the engine Ne at the time point of detection of the intake pipe pressure Pb, but the influence of the error of the intake pipe pressure Pb resulting from the difference of the amount of bypass air Qb at the time point of detection of the intake pipe pressure Pb is not taken into consideration, so there has been a problem that proper correction might not be able to be made.

In addition, in the known device disclosed in the above-mentioned second patent document, the correction section is used that reads the error of the intake pipe pressure Pb, which results from the difference of the amount of bypass air Qb, as the correction function g based on the number of revolutions per minute of the engine Ne and the amount of bypass air Qb, but the amount of bypass air Qb is estimated by the use of a map that has been set beforehand, so when there are tolerances of component parts or there occurs a change over time thereof due to the influence of deposits, etc., the actual amount of bypass air becomes different from the amount of bypass air Qb that is estimated from the map set beforehand, and in this case, too, there is still a problem that proper correction might not be made.

Also, in the known device disclosed in the above-mentioned second patent document, a correction due to the correction function g is executed with respect to only the intake pipe pressure PbOFF in the absence of EGR, but at the time of EGR introduction, the EGR gas is introduced from the exhaust pipe 15 into the intake pipe 3 under the action of a differential pressure between an upstream pressure (in the exhaust pipe 15) upstream of the EGR valve 12 and a downstream pressure (the intake pipe pressure Pb) downstream of the EGR valve 12. As a result, there is the following problem. That is, when the amount of bypass air Qb (the area of the bypass air passage) is varied, not only the characteristic curves WA, WB for the relation between the intake pipe pressure Pb and the number of revolutions per minute of the engine Ne in the absence of EGR (see FIG. 12) but also the characteristic curves WC, WD for the relation between the intake pipe pressure Pb and the number of revolutions per minute of the engine Ne in the presence of EGR are also changed, in spite of which it is impossible to make proper correction with respect to the pressure difference ΔP due to the presence and absence of EGR.

Moreover, as a consequence of this, there is also another problem that in case where a failure determination is made based on the amount of change of the intake pipe pressure Pb (the pressure difference ΔP) according to the change in the amount of intake air Qa due to the presence and absence of EGR, there is a possibility, in the worst case, that a failure state can not be detected or a normal state may be mis-detected as a failure state.

Further, in the known device disclosed in the above-mentioned second patent document, a failure determination is not carried out in a temperature range in which the amount of bypass air Qb is increased (e.g., the cooling water temperature Tw being equal to 80° C. or below), so there is a further problem that the temperature region where failure detection processing (failure diagnosis) is executed is limited.

SUMMARY OF THE INVENTION

The present invention is intended to solve the problems as referred to above, and has for its object to obtain a control apparatus for an internal combustion engine which is capable of preventing the mis-detection of failure thereby to achieve a highly reliable failure determination for an EGR system by properly compensating for an error in the intake pipe pressure due to the influences of a change in the number of revolutions per minute of the engine caused by the difference of a deceleration state, and of a change in the amount of bypass air.

Another object of the present invention is to obtain a control apparatus for an internal combustion engine which is capable of increasing a temperature region in which failure detection is executed, and preventing mis-detection thereby to achieve a highly reliable failure determination for an EGR system by always performing a failure determination at constant intake pipe pressure thereby to compensate for an error in the intake pipe pressure (including the influences of the tolerances of component parts and deposits) caused by a change in the number of revolutions per minute of the engine or by a change in the amount of bypass air including during an engine cooling state.

A further object of the present invention is to obtain a control apparatus for an internal combustion engine which is capable of suppressing influences, on driveability during execution or upon termination of failure detection processing, of a change in the intake pipe pressure (negative pressure) caused when an EGR valve is forced to open and close at the time of execution of the failure detection processing.

Bearing the above objects in mind, according to the present invention, there is provided a control apparatus for an internal combustion engine including: a throttle valve that is opened and closed in an intake pipe for adjusting an amount of air supplied to the engine through the intake pipe; and a bypass air amount control section that controls an amount of bypass air flowing while bypassing the throttle valve; an EGR tube that recirculates an exhaust gas exhausted from the engine into the intake pipe at a location downstream of the throttle valve; an EGR valve that adjusts a flow rate of EGR of the exhaust gas flowing through the EGR tube; and a sensor part that detects an operating condition of the engine including an intake pipe pressure in the intake pipe and the number of revolutions per minute of the engine. The apparatus further includes; an EGR control section that controls the EGR valve in accordance with operating condition information from the sensor part; a failure determination condition detection section that detects, based on the operating condition information, whether a failure determination condition for the EGR control section is satisfied; an EGR valve forced opening and closing section that forcedly opens and closes the EGR valve based on the operating condition information when the failure determination condition is satisfied; and a failure determining section that determines whether the EGR control section is in failure, by comparing a pressure change index value based on the intake pipe pressure at the time of the forced opening and closing of the EGR valve with a failure determination value. The failure determination condition detection section includes an intake pipe pressure adjustment section that adjusts the intake pipe pressure so as to be within a predetermined range by using the bypass air amount control section. The failure determination condition detection section detects, as a satisfied state of the failure determination condition, that the intake pipe pressure is within the predetermined range.

According to the present invention, when the deceleration state of the engine (including during a fuel cut-off operation) is detected, the EGR valve is forced to open and close after the intake pipe pressure has been adjusted to be within the predetermined range by using the intake pipe pressure adjustment section, so that a pressure change index value obtained based on the intake pipe pressure at the time of the forced opening and closing of the EGR valve is compared with a failure determination value so as to make a determination as to whether the EGR control section is in failure. As a result, a failure determination can always be done with the intake pipe pressure becoming a predetermined characteristic with respect to the number of revolutions per minute of the engine, whereby it is possible to precisely compensate for an error in the intake pipe pressure Pb due to a change in the amount of bypass air caused by the engine load, the difference of the engine cooling state, etc., including the tolerances of component parts and the influence of deposits, thereby making it possible to perform an accurate failure determination for the EGR control device.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

Figure 8:
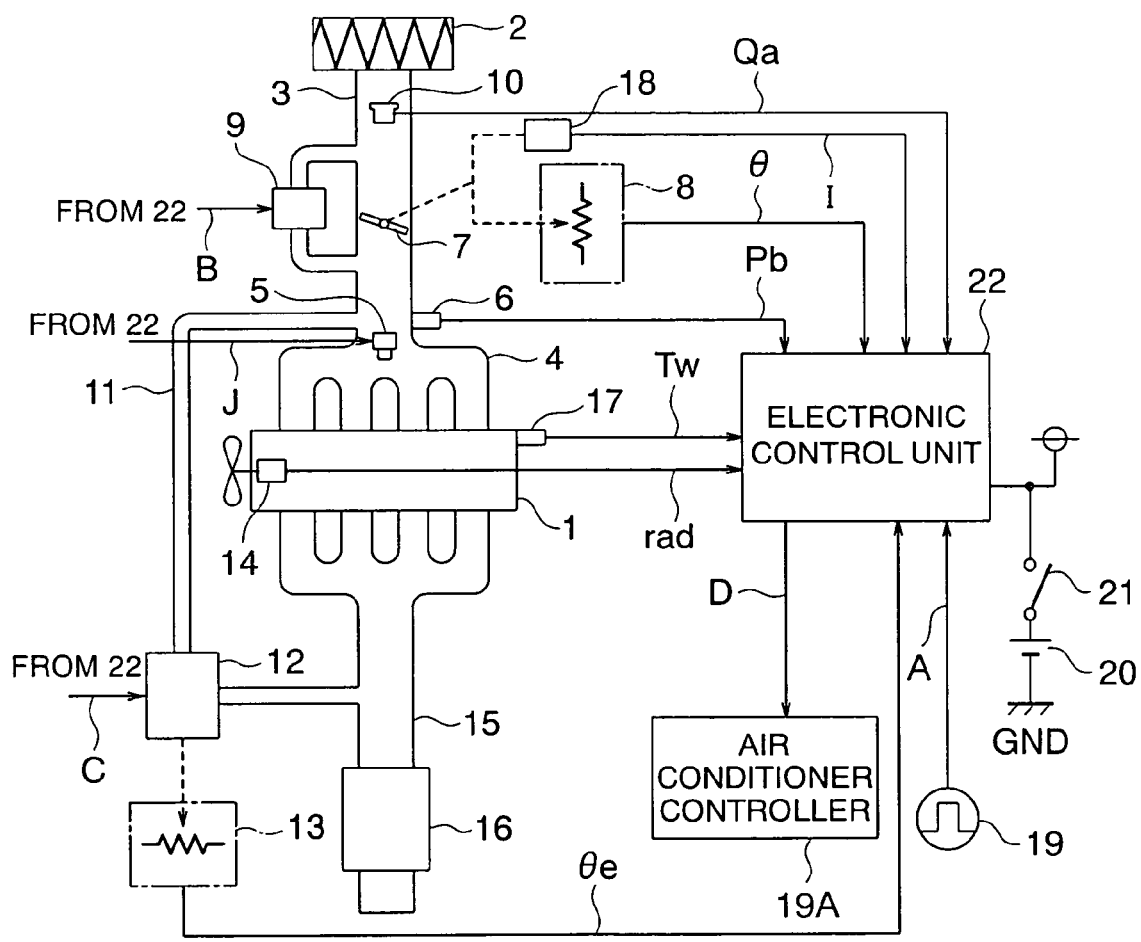
FIG. 8 is a constructional view showing the entire system of a general control apparatus for an internal combustion engine.
Figure 9:
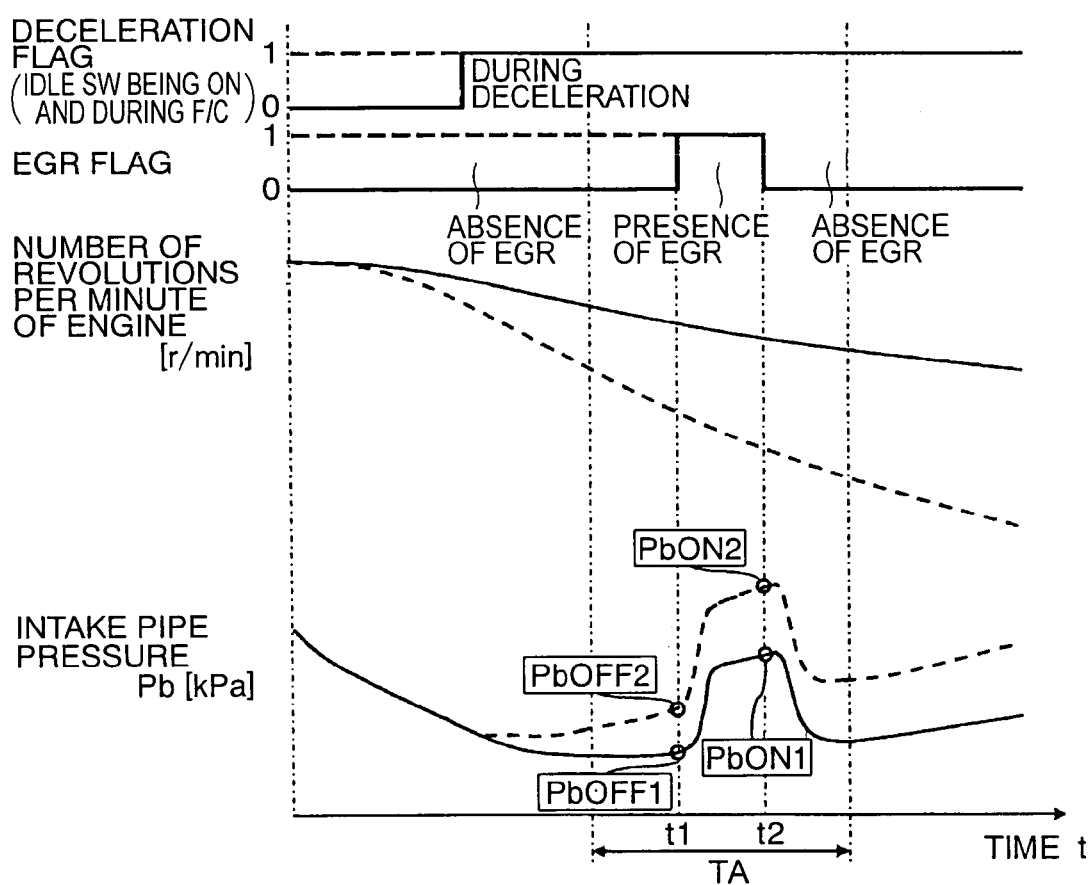
FIG. 9 is a timing chart illustrating one example of the processing operation of a known failure detection device for an EGR system.
Figure 10:
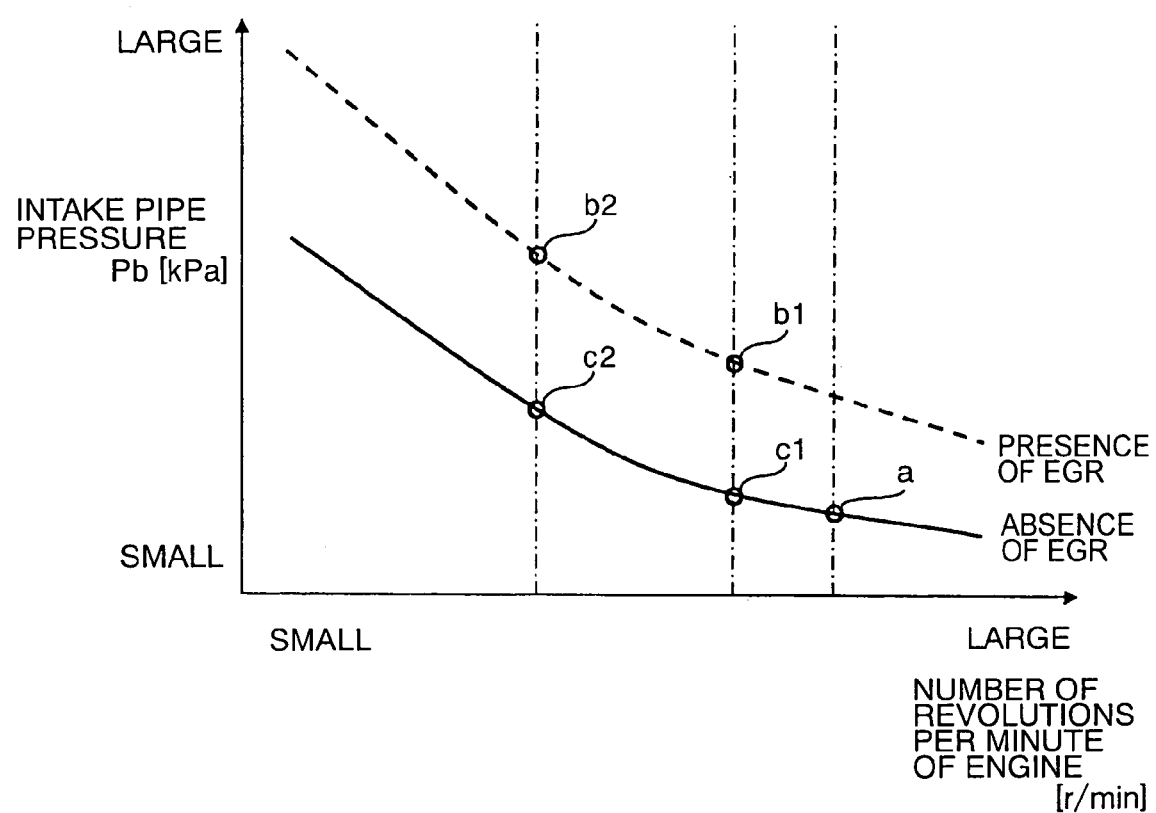
FIG. 10 is a characteristic view illustrating a general relation between the number of revolutions per minute of an engine and intake pipe pressures in the presence and absence of EGR.
Figure 11:
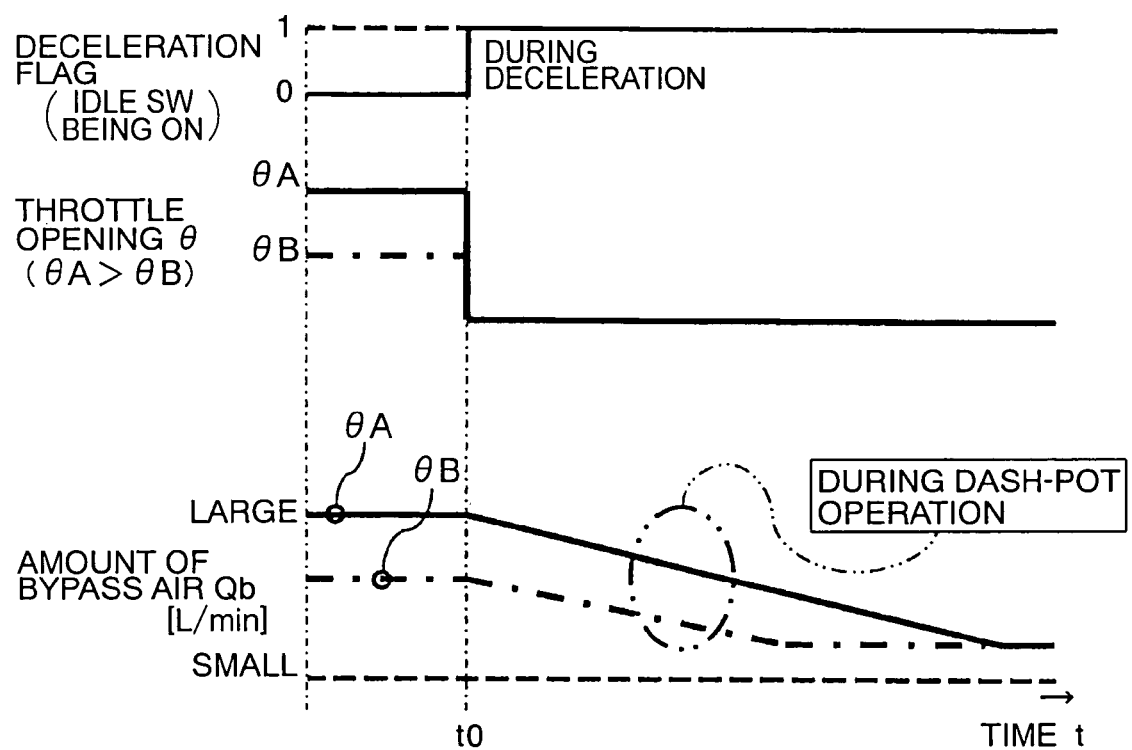
FIG. 11 is a timing chart illustrating the general behavior of an amount of bypass air due to its change over time during deceleration.

Here, note that the overall configuration of a system related to a first embodiment of the present invention is as shown in FIG. 8, but only a part of failure detection processing executed in an electronic control unit 22 is different from the above-mentioned one.

That is, as shown in FIG. 8, a control apparatus for an internal combustion engine according to the first embodiment of the present invention includes a throttle valve 7 that is arranged in an intake pipe 3 so as to be opened and closed to adjust an amount of air Qa supplied to an engine 1 through the intake pipe 3, a bypass air amount control section 9 that controls an amount of bypass air Qb flowing while bypassing the throttle valve 7, an EGR (exhaust gas recirculation) tube 11 that serves to recirculate an exhaust gas exhausted from the engine 1 to a portion of the intake pipe 3 downstream of the throttle valve 7, an EGR valve 12 that adjusts the flow rate of EGR Qe of the exhaust gas flowing through the EGR tube 11, and a sensor part (6, 8, 10, 13, 14, 17, 18 and 19) that detects the operating condition of the engine 1 including an intake pipe pressure Pb in the intake pipe 3.

In addition, the control apparatus for an internal combustion engine according to the first embodiment of the present invention is provided with an electronic control unit 22. The electronic control unit 22 includes an EGR control section that controls the EGR valve 12 in accordance with operating condition information from the sensor part, a failure determination condition detection section that detects, based on the operating condition information, whether a failure determination condition for the EGR control section is satisfied, an EGR valve forced opening and closing section that forcedly opens and closes the EGR valve 12 during the time when the failure determination condition is satisfied, and a failure determining section that compares a pressure change index value (pressure difference ΔPF) based on the intake pipe pressure Pb at the time of the forced opening and closing of the EGR valve 12 with a predetermined failure determination value PFAIL(NeON) thereby to determine whether the EGR control section is in failure.

The failure determination condition detection section in the electronic control unit 22 includes an intake pipe pressure adjustment section that adjusts the intake pipe pressure Pb so as to be within a predetermined range by using the bypass air amount control section 9.

The failure determination condition detection section detects, as a satisfied state of the failure determination condition, that the intake pipe pressure Pb is within the predetermined range.

In this case, specifically, the intake pipe pressure Pb detected with a control amount (TISC(QbEG)) of the bypass air amount control section 9 with respect to a predetermined target amount of bypass air (QbEG) is assumed to be in a state of being within the predetermined range, as will be described later.

Now, reference will be made to the failure detection processing of the EGR control section according to the first embodiment of the present invention while referring to FIG. 8 together with a flow chart in FIG. 1.

Figure 1:
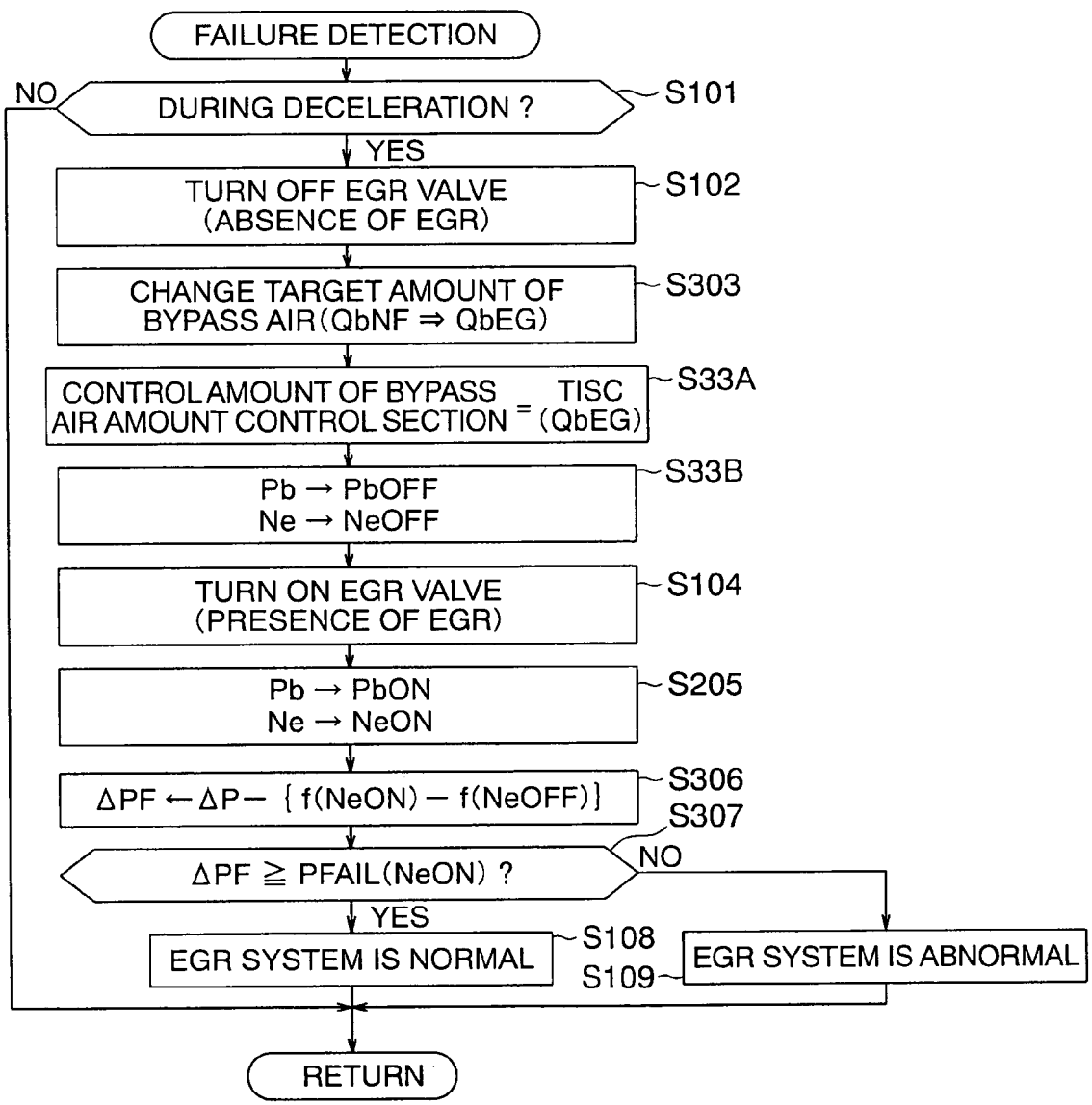
FIG. 1 is a flow chart illustrating the processing operation of a control apparatus for an internal combustion engine according to a first embodiment of the present invention (corresponding to claim 1).

FIG. 1 illustrates the failure detection processing of the electronic control unit 22 according to the first embodiment of the present invention.

In FIG. 1, steps 101, S102, S104, S108 and S109 are similar to the processing disclosed in the above-mentioned first patent document, and step S205 is similar to the processing disclosed in the above-mentioned second patent document.

First of all, the number of revolutions per minute of the engine Ne is detected based on an engine rotation angle rad detected by the angle sensor 14 by using a predetermined operating information detection processing routine (not shown), and it is determined, based on the number of revolutions per minute of the engine Ne thus detected and an idle signal I from an idle switch 18, whether the vehicle is in a deceleration state (including during fuel cut-off (F/C) operation) (step S101).

That is, by determining whether the number of revolutions per minute of the engine Ne is equal to or more than a predetermined number of revolutions per minute (the number of revolutions per minute during normal operation) and whether the throttle valve 7 is in a fully closed state (the idle signal I being in an on state), a determination is made as to whether the engine 1 is in a deceleration state (step S101).

When it is determined in step S101 that the engine 1 is not in a deceleration state (that is, NO), the failure detection processing of FIG. 1 is terminated at once and a return is performed.

On the other hand, when it is determined in step S101 that the engine 1 is in a deceleration state (that is, YES), the EGR valve 12 is fully closed to put the engine 1 into a non-EGR operation state (step S102).

Here, note that in the deceleration state, the initial state of the engine 1 is already a non-EGR operation state, so the EGR valve 12 need not be forced to fully close.

Also, in the electronic control unit 22, a target amount of bypass air QbNF based on the feedback control of the number of revolutions per minute of the engine Ne is calculated from the operating condition information (a throttle opening θ, the presence or absence of an engine load, a cooling water temperature Tw, etc.) detected beforehand by using the operating information detection processing routine (not shown).

Moreover, the control amount of the bypass air amount control section 9 is calculated by a function value TISC based on the target amount of bypass air QbNF.

At this time, the control amount of the bypass air amount control section 9 varies depending on the difference of the operating condition such as the throttle opening θ, the cooling water temperature Tw, the presence or absence of an air conditioner (an engine load), etc., so that the cross-sectional area of an air passage bypassing the throttle valve 7 is changed. That is, the control amount of the bypass air amount control section 9 represents the cross-sectional area of the air passage bypassing the throttle valve 7.

Subsequently, the target amount of bypass air is changed from the value QbNF calculated based on the operating condition information to the target amount of bypass air QbEG for EGR failure determination (hereinafter also referred to as an EGR failure determination target bypass air amount QbEG) stored beforehand so as to bring the intake pipe pressure to a predetermined pressure state or value (step S303).

As a result, the control amount of the bypass air amount control section 9 is updated to the control amount TISC (QbEG) based on the target amount of bypass air QbEG (step S33A).

In other words, steps S303 and S33A together constitute an intake pipe pressure adjustment section.

Thereafter, the intake pipe pressure Pb, being in the state of the target amount of bypass air QbEG, is stored as an intake pipe pressure PbOFF in the absence of EGR, and the number of revolutions per minute of the engine Ne at the detection time point of the intake pipe pressure PbOFF is stored as a number of revolutions per minute of the engine NeOFF in the absence of EGR (step S33B).

Then, the EGR valve 12 is opened (turned on) to put the engine 1 into an EGR operation state (step S104) so that the exhaust gas is introduced from the exhaust pipe 15 into the intake pipe 3 through the EGR tube 11, after which the intake pipe pressure Pb detected at this time is stored as an intake pipe pressure PbON in the presence of EGR, and the number of revolutions per minute of the engine Ne at the detection time point of the intake pipe pressure PbON is stored as a number of revolutions per minute of the engine NeON in the presence of EGR (step S205).

Here, note that the degree of opening of the EGR valve 12 set in step S104 is a relatively large value to such an extent that a satisfactorily large value of the pressure difference ΔP can be obtained in the intake pipe 3 when the EGR valve 12 is forced to open and close.

In addition, the processing of detecting the intake pipe pressure PbOFF to be stored in step S33B is executed after the intake pipe pressure Pb becomes stable (i.e., after a lapse of about one second) after the control amount update processing by the bypass air amount control section 9 (step S33A) has been executed.

Similarly, the processing of detecting the intake pipe pressure PbON to be stored in step S205 is executed after the intake pipe pressure Pb becomes stable (i.e., after a lapse of about one second) after the processing of forcedly opening the EGR valve 12 (EGR operation) (step S104) has been executed.

Subsequently, a corrected pressure difference ΔPf (pressure change index value) is calculated based on a deviation between the pressure difference ΔP between the intake pipe pressure PbON in the presence of EGR and the intake pipe pressure PbOFF in the absence of EGR and a corrected value obtained from a correction function f based on the numbers of revolutions per minute of the engine NeON, NeOFF in the presence and absence of EGR, as shown by the following expression (5) (step S306).

$$\Delta PF = \Delta P - \{f(NeON) - f(NeOFF)\} \tag{5}$$

Figure 12:
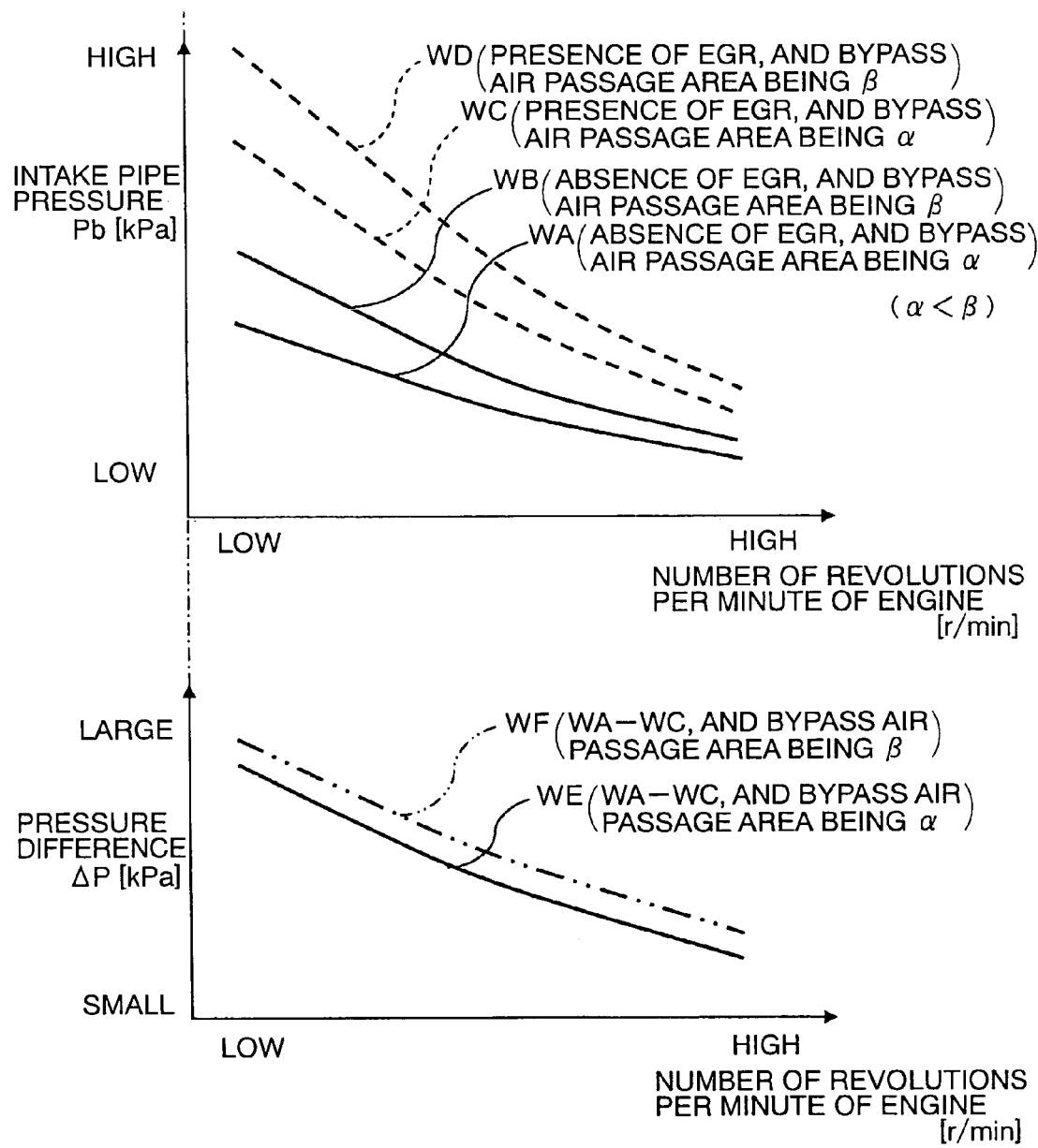
FIG. 12 is a characteristic view illustrating a general relation between the number of revolutions per minute of an engine and an intake pipe pressure, and a relation between the number of revolutions per minute of the engine and a pressure difference between intake pipe pressures due to the presence and absence of EGR together with their changes over time in a deceleration state.

Here, supplementary reference will be made to the intake pipe pressure adjustment section (steps S303, S33A) in the electronic control unit 22 while referring to the above-mentioned characteristic view (FIG. 12).

As previously stated, FIG. 12 shows the relation between the number of revolutions per minute of the engine Ne and the intake pipe pressure Pb, and the relation between the number of revolutions per minute of the engine Ne and the pressure difference ΔP due to the presence and absence of EGR, and it is found from this figure that when the area of the bypass air passage (the target amount of bypass air) varies, a difference is generated in the calculated value of the pressure difference ΔP between the intake pipe pressures Pb in the presence and absence of EGR.

Here, let us assume that the target amount of bypass air is controlled to the value QbNF in accordance with the difference of the engine load or the engine cooling state, and the relation between the number of revolutions per minute of the engine Ne and the intake pipe pressure Pb in the absence of EGR corresponds to the characteristic curve WB (the bypass air passage area β) in FIG. 12.

Also, let us assume that the characteristic curve WA (the bypass air passage areas α) represents the relation between the number of revolutions per minute of the engine Ne and the intake pipe pressure Pb in the predetermined state of the intake pipe pressure.

In this case, the amount of bypass air, which becomes the characteristic curve WA, is stored beforehand as the target amount of bypass air QbEG to achieve an intake pipe pressure of a predetermined state (within a predetermined range) (the failure determination condition being satisfied).

By changing the target amount of bypass air QbNF at the time of normal operation (during feedback control according to the number of revolutions per minute of the engine) to the target amount of bypass air QbEG for failure determination (step S303), the intake pipe pressure is controlled to the predetermined intake pipe pressure state (within the predetermined range) at a time point at which the intake pipe pressure PbOFF in the absence of EGR is measured (step S33B).

Accordingly, the intake pipe pressure PbOFF in the absence of EGR stored in step S33B can always be obtained as a value along the characteristic curve WA.

Similarly, the intake pipe pressure PbON in the presence of EGR stored in step S205 can always be obtained as a value along the characteristic curve WC.

Further, the pressure difference ΔP(PbON−PbOFF) due to the presence and absence of EGR can always be obtained as a value along the characteristic curve WE.

In other words, in the above expression (5), the pressure difference ΔP can always be obtained as a value along a prescribed characteristic curve.

Accordingly, for a corrected value {f(NeON)−f(NeOFF)} obtained from the correction function f based on the numbers of revolutions per minute of the engine NeON, NeOFF in the presence and absence of EGR, a further appropriate value can be obtained with respect to the pressure difference ΔP caused by the difference of the number of revolutions per minute of the engine Ne, so it is found that the pressure difference ΔPF (corrected value) for EGR failure determination (hereinafter also referred to as an EGR failure determination pressure difference ΔPF) can always be calculated properly.

As stated above, after adjusting the intake pipe pressure Pb to the predetermined pressure state in the intake pipe pressure adjustment section (steps S303, S33A), the electronic control unit 22 calculates the pressure difference ΔPF for failure determination (step S306).

Returning to FIG. 1, it is then determined whether the corrected pressure difference ΔPF is greater than or equal to a failure determination value PFAIL(NeON) (step S307), and when determined as ΔPF≧PFAIL(NeON) (that is, YES), it is assumed that the pressure difference ΔPF is sufficient (the EGR gas is introduced to a satisfactory extent), so a result of determination indicating that the EGR control section (the EGR system) including the EGR valve 12 is normal is generated (step S108), and the processing routine of FIG. 1 is terminated, with a return being performed.

On the other hand, when it is determined as ΔPF<PFAIL (NeON) in step S307 (that is, NO), it is assumed that the pressure difference ΔPF is small (the EGR gas being not introduced to a satisfactory extent), so a result of determination indicating that the EGR system is abnormal is generated (step S109), and the processing routine of FIG. 1 is terminated, with a return being performed.

However, it is undesirable to terminate the processing routine of FIG. 1 in the presence of EGR, so in actuality, it is terminated, though not illustrated here, with the EGR valve 12 being fully closed (in a non-EGR operation state).

In addition, in the above explanation, the individual detected values (PbOFF, NeOFF, PbON, NeON) in the presence and absence of EGR are stored in steps S33B, S205, and the corrected pressure difference ΔPF is calculated in step S306, but the individual intake pipe pressure detected values (PbOFF, PbON) may be directly corrected by using the correction function f for the number of revolutions per minute of the engine Ne, and a deviation of the intake pipe pressure detected value thus corrected may be calculated as the corrected pressure difference ΔPF.

As described above, a failure detection section of the EGR control device according to the first embodiment of the present invention includes the throttle valve 7 that adjusts the amount of intake air Qa supplied from the intake pipe 3 to the engine 1, the bypass air amount control section 9 that controls the amount of bypass air Qb flowing while bypassing the throttle valve 7, the EGR tube 11 that recirculates the exhaust gas of the engine 1 to a portion of the intake pipe 3 downstream of the throttle valve 7, the EGR valve 12 that adjusts the flow rate of EGR Qe of the exhaust gas flowing through the EGR tube 11, the sensor part that detects the operating condition of the engine 1, and the EGR control section (the electronic control unit 22) that controls the EGR valve 12 in accordance with operating condition information from the sensor part.

The operating condition information includes at least the number of revolutions per minute of the engine Ne and the intake pipe pressure Pb, and the electronic control unit 22 includes the failure determination condition detection section that detects, based on the operating condition information (the deceleration condition according to the idle signal I indicating the fully closed state of the throttle valve 7), whether the failure determination condition for the EGR control section is satisfied, the EGR valve forced opening and closing section that forcedly open and close the EGR valve 12 during the time when the failure determination condition is satisfied, and the failure determining section that determines, based on the intake pipe pressures PbON, PbOFF at the time of the forced opening and closing of the EGR valve, whether the EGR control section (including the EGR valve 12) is in failure.

The failure determination condition detection section in the electronic control unit 22 includes the intake pipe pressure adjustment section, and when the deceleration state of the engine 1 is detected based on the number of revolutions per minute of the engine Ne and the fully closed state of the throttle valve 7 (the idle signal I) and when the fuel cut-off operation (fuel supply stop) of the engine 1 is detected based on the fuel injection control signal J during deceleration, the intake pipe pressure adjustment section adjusts the intake pipe pressure Pb to a value corresponding to the predetermined state, whereby the failure determination condition detection section can detect, as a satisfied state of the failure determination condition, that the intake pipe pressure Pb is in the predetermined range.

In addition, the failure determining section includes an intake pipe pressure correction section and an intake pipe pressure difference calculation section (step S306). The intake pipe pressure correction section corrects the intake pipe pressures PbON, PbOFF detected upon the forced opening and closing, respectively, of the EGR valve 12 by using the numbers of revolutions per minute of the engine NeON, NeOFF detected upon the forced opening and closing of the EGR valve 12, and the intake pipe pressure difference calculation section calculates the pressure difference $\Delta$PF due to the forced opening and closing of the EGR valve 12 based on the corrected intake pipe pressure. As a result, the failure determining section can accurately determine the failure of the EGR control section by comparing the corrected pressure difference $\Delta$PF with the failure determination value PFAIL(NeON).

Thus, by calculating the pressure difference $\Delta$PF for failure determination (step S306) after adjusting the intake pipe pressure Pb to the predetermined pressure state by means of the intake pipe pressure adjustment section (steps S303, S33A), a variation of the intake pipe pressure Pb according to the change in the number of revolutions per minute of the engine Ne due to the difference of the deceleration state and a variation of the intake pipe pressure Pb according to the change in the amount of bypass air due to the engine load, the difference of the engine cooling state, etc., are compensated for, whereby the pressure difference $\Delta$PF properly corrected can be calculated.

Accordingly, the pressure difference $\Delta$PF for failure determination can always be obtained properly without limiting the region where the failure detection of the EGR determination section (the EGR system) is executed, as a consequence of which a failure determination can be made based on the intake pipe pressure whose variation has been compensated for with the state of the intake pipe pressure always becoming a predetermined characteristic with respect to the number of revolutions per minute of the engine Ne.

That is, the temperature of the engine 1 (the cooling water temperature Tw), the engine load, variations of component parts such as the bypass air amount control section 9 (the ISC solenoid), the throttle valve 7, etc., and a variation of the intake pipe pressure Pb resulting from a secular change with the lapse of time can be compensated for, and the region in which failure detection can be executed is increased, while preventing mis-detection, whereby it is possible to obtain a control apparatus for an internal combustion engine which can achieve a highly reliable failure determination for the EGR system.

Embodiment 2

In the above-mentioned first embodiment (FIG. 1), by only adjusting the bypass air amount control section 9 to the control amount TISC(QbEG) based on the target amount of bypass air QbEG (step S33A), the failure determination condition is assumed to be satisfied (the intake pipe pressure Pb being within the predetermined range), and the pressure difference $\Delta$PF based on the detected value is calculated, but whether the failure determination condition is satisfied may be determined by using a predetermined range calculated based on the number of revolutions per minute of the engine Ne.

Hereinafter, reference will be made to a second embodiment of the present invention while referring to a flow chart in FIG. 2 together with FIG. 8.

Figure 2:
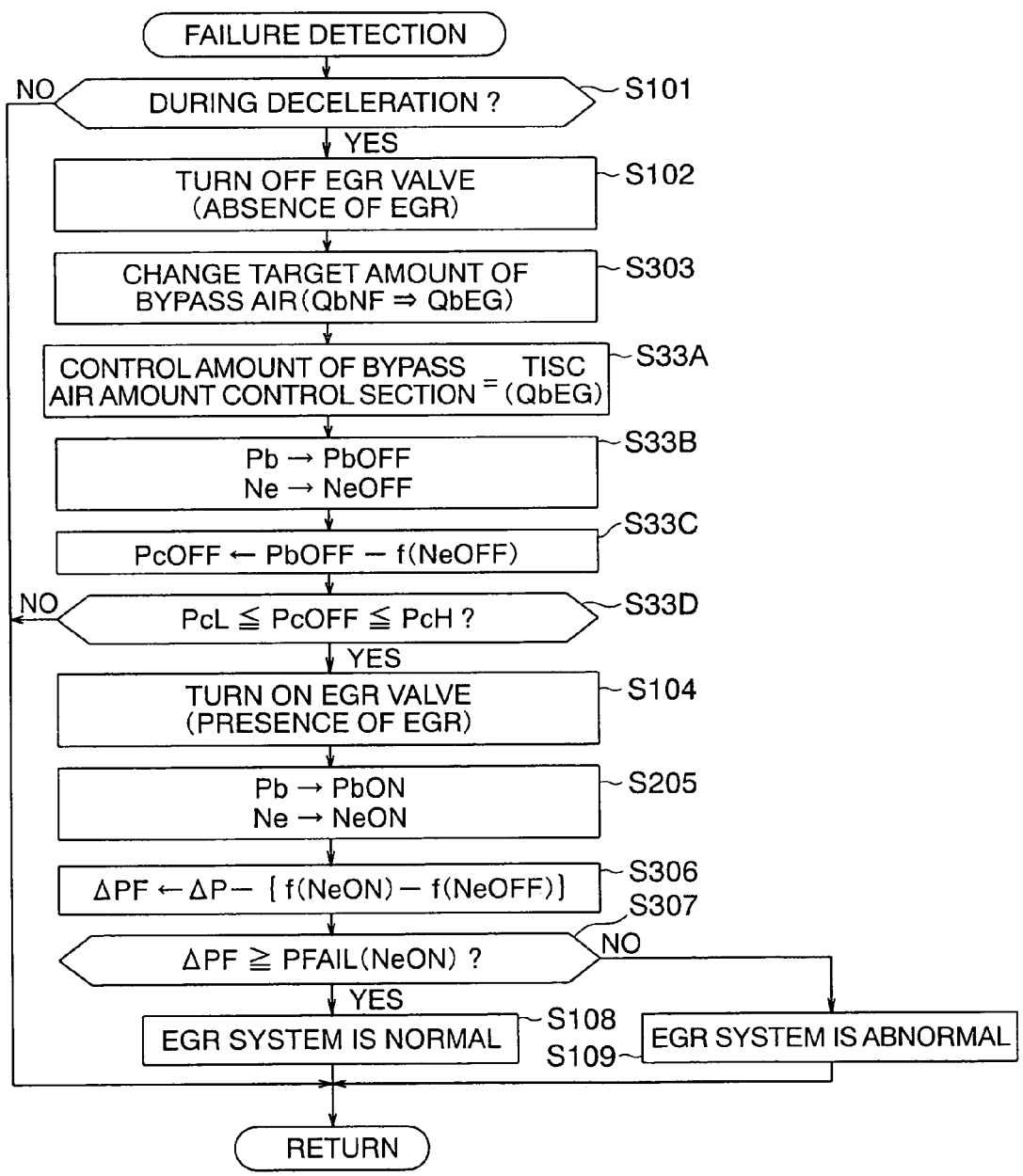
FIG. 2 is a flow chart illustrating the processing operation of a control apparatus for an internal combustion engine according to a second embodiment of the present invention (corresponding to claim 2).

FIG. 2 illustrates a failure detection processing operation executed in the electronic control unit 22, in which processes similar to the above-mentioned ones (FIG. 1) are identified by the same symbols as above.

In this case, the electronic control unit 22 takes in the number of revolutions per minute of the engine Ne as operating condition information, and calculates a predetermined range based on the number of revolutions per minute of the engine Ne.

Specifically, the predetermined range is substantially corrected by correcting a detected value of the intake pipe pressure Pb to be compared within the predetermined range in accordance with the number of revolutions per minute of the engine Ne.

That is, in FIG. 2, following the step S33B in FIG. 1, there are added a process of correcting the intake pipe pressure PbOFF based on the number of revolutions per minute of the engine Ne (step S33C) and a process of comparing a corrected reference intake pipe pressure PcOFF with a predetermined range (PcL through PcH) (step S33D).

In FIG. 2, first of all, following the processes (steps S101 through S33B) similar to the above-mentioned ones, the reference intake pipe pressure PcOFF in the absence of EGR with the influence thereon of the number of revolutions per minute of the engine Ne having been corrected is calculated by using the intake pipe pressure PbOFF in the absence of EGR stored in step S33B and the correction function f based on the number of revolutions per minute of the engine NeOFF at the detection time point of the intake pipe pressure PbOFF, as shown in the following expression (6) (step S33C).

$$PcOFF = PbOFF - f(NeOFF) \quad (6)$$

Then, the predetermined range specified by a lower limit value PcL and an upper limit value PcH for permission of failure determination is decided, and the reference intake pipe pressure PcOFF corrected in step S33C is compared with the predetermined range thus decided, whereby it is determined whether the corrected reference intake pipe pressure PcOFF is within the predetermined range (i.e., PcL$\leq$PcOFF$\leq$PcH) (step S33D).

When it is determined in step S33D that the corrected reference intake pipe pressure PcOFF is outside the predetermined range (that is, NO), even if the bypass air amount control section 9 is driven by the control amount TISC (QbEG) based on the target amount of bypass air QbEG, an amount of deviation with respect to the predetermined state of the intake pipe pressure (abnormality detectable state) is large, and a pressure difference $\Delta$P for appropriate failure determination can not be calculated, so it is assumed that there is a possibility of mis-detecting an abnormal state. Thus, the failure detection processing routine of FIG. 2 is terminated at once, and a return is performed.

On the other hand, when it is determined as PcL$\leq$PcOFF$\leq$PcH) in step S33C (that is, YES), the control flow advances to the above-mentioned step S104 onward, where failure detection processing is executed based on the corrected pressure difference $\Delta$PF, similarly as described above.

In the above-mentioned first embodiment, the intake pipe pressure adjustment section adjusts the intake pipe pressure Pb to the predetermined pressure state (which is assumed to be within the predetermined range) by using the target amount of bypass air QbEG for EGR failure determination corresponding to the predetermined state of the intake pipe pressure.

Accordingly, in case where the amount of intake air Qa containing the amount of bypass air Qb with the throttle valve 7 being in the fully closed state or the flow rate of EGR Qe in the presence of EGR (with the EGR valve 12 being opened) is changed due to variations of component parts such as the bypass air amount control section 9 (the ISC solenoid), the throttle valve 7, the EGR valve 12, etc., or due to changes with the lapse of time such as the influence of deposits, etc., it is impossible to compensate for a resultant variation of the intake pipe pressure.

However, according to the second embodiment of the present invention, the reference intake pipe pressure PcOFF in the absence of EGR with the influence thereon of the number of revolutions per minute of the engine Ne having been corrected is calculated from the intake pipe pressure PbOFF in the absence of EGR and the correction function f based on the number of revolutions per minute of the engine NeOFF at the detection time point of the intake pipe pressure PbOFF, and a determination as to whether an amount of deviation with respect to the predetermined target state of the intake pipe pressure is within an allowable range is made depending on whether the reference intake pipe pressure PcOFF is within the predetermined range. As a result, when the amount of deviation becomes outside the allowable range, it is assumed that the variation of the intake pipe pressure is largely due to the above-mentioned factors, so the failure detection processing is interrupted, thereby making it possible to prevent an incorrect determination.

Embodiment 3

In the above-mentioned second embodiment (FIG. 2), when the corrected reference intake pipe pressure PcOFF does not satisfy a permission condition (within a predetermined range) even if the bypass air amount control section 9 is driven by the control amount TISC(QbEG) based on the target amount of bypass air QbEG corresponding to the predetermined state of the intake pipe pressure (the failure determination condition being satisfied), the failure detection processing is terminated (interrupted) at once, but the target amount of bypass air QbEG for EGR failure determination may instead be corrected in a feedback manner until the permission condition is satisfied.

Hereinafter, reference will be made to a third embodiment of the present invention while referring to flow charts in FIGS. 3 and 4 together with FIG. 8.

Figure 3:
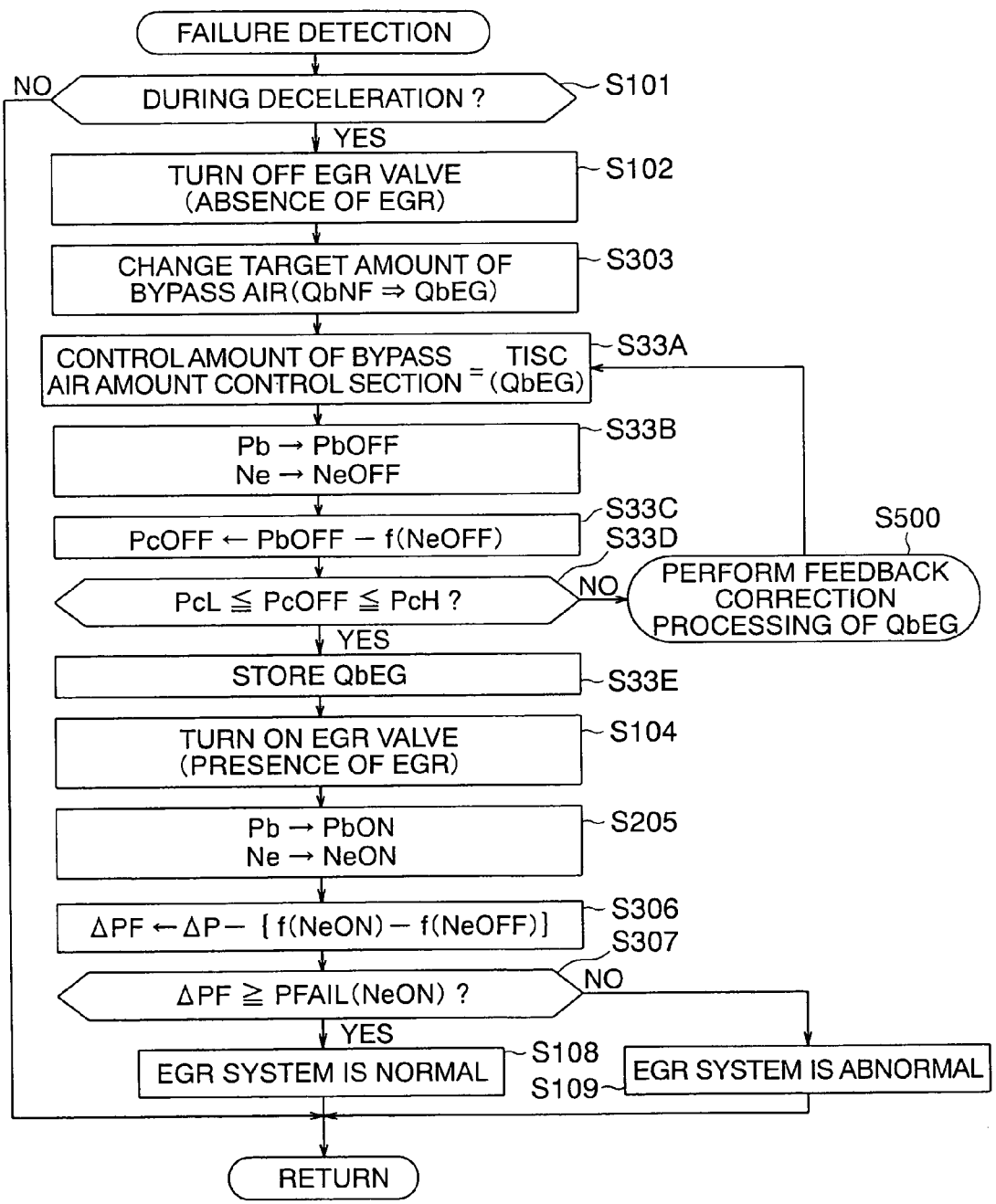
FIG. 3 is a flow chart illustrating the processing operation of a control apparatus for an internal combustion engine according to a third embodiment of the present invention (corresponding to claims 3 through 5).

FIG. 3 illustrates a failure detection processing operation executed in the electronic control unit 22, in which processes similar to the above-mentioned ones (FIG. 2) are identified by the same symbols as above.

Figure 4:
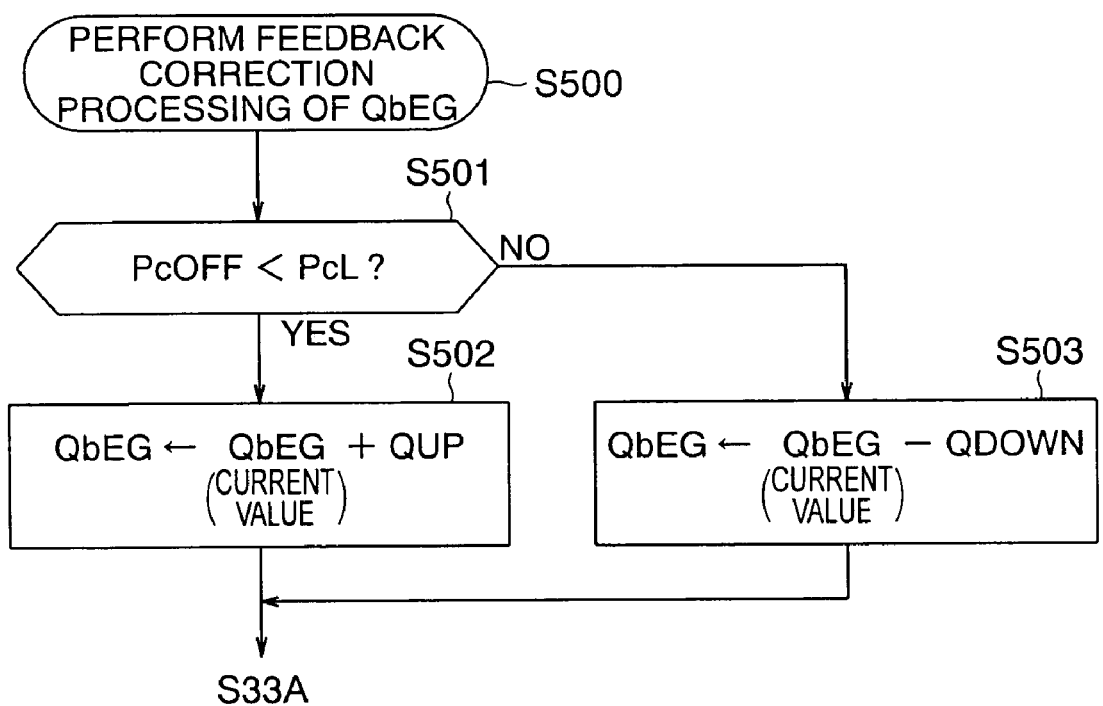
FIG. 4 is a flow chart illustrating the operation of a feedback correction processing routine for a target amount of bypass air for failure determination according to the third embodiment of the present invention.

FIG. 4 specifically illustrates a feedback correction processing routine (step S500) in FIG. 3, which corresponds to a processing operation according to the bypass air amount control correction section in the electronic control unit 22.

In FIG. 3, following the step S33C in FIG. 2, there are added a processing routine of correcting the target amount of bypass air QbEG in a feedback manner (step S500) and a process of storing the value of the target amount of bypass air QbEG after having been corrected in a feedback manner when the permission condition is satisfied (step S33E).

After the feedback correction processing routine of the target amount of bypass air QbEG (step S500) is executed, the control flow shifts to the control amount setting processing of the bypass air amount control section 9 (step S33A).

In this case, the predetermined range is calculated based on the intake pipe pressure Pb and the number of revolutions per minute of the engine Ne.

In addition, the intake pipe pressure adjustment section in the electronic control unit 22 includes a bypass air control amount correction section (step S500 in FIG. 3) which corrects the control amount TISC(QbEG) of the bypass air amount control section 9 based on the intake pipe pressure and the number of revolutions per minute of the engine in a feedback manner so that the intake pipe pressure (reference intake pipe pressure PcOFF) becomes within the predetermined range.

Also, the bypass air control amount correction section increasingly or decreasingly corrects the target amount of bypass air QbEG in accordance with the polarity (plus or minus) of the amount of deviation of the reference intake pipe pressure PcOFF with respect to the predetermined range, whereby a feedback correction amount of the control amount TISC(QbEG) is changed.

Further, when it is detected that the reference intake pipe pressure PcOFF is in the predetermined range (i.e., the failure detection condition being satisfied), the bypass air control amount correction section terminates the feedback correction of the control amount TISC(QbEG), stores the value of the target amount of bypass air QbEG at the time point at which the state of the reference intake pipe pressure PcOFF being in the predetermined range was detected (step S33E in FIG. 3), and also substantially stores the value of the control amount TISC(QbEG) of the bypass air amount control section 9.

As a result, the bypass air amount control section 9 comes to use the control amount (the target amount of bypass air QbEG) stored in the bypass air control amount correction section as the initial value of the control amount at the next failure detection.

In FIG. 3, first of all, similar to the above-mentioned, following the steps S101 through S33C, it is determined whether the reference intake pipe pressure PcOFF in the absence of EGR with the influence thereon of the number of revolutions per minute of the engine Ne having been corrected is within the predetermined range (step S33D), and when it is determined that the corrected reference intake pipe pressure PcOFF is outside the predetermined range (that is, NO), the control flow advances to the feedback correction processing routine of the target amount of bypass air QbEG (step S500), where the processing of FIG. 4 is executed.

In FIG. 4, first of all, it is determined whether the reference intake pipe pressure PcOFF is lower than the lower limit value PcL for permission of failure determination (step S501), and when determined as PcOFF<PcL (that is, YES), it is assumed that the amount of bypass air Qb is in a short state, so an increase correction value QUP is added to the target amount of bypass air QbEG (the current value) (step S502), and a return to step S33A is performed.

On the other hand, when it is determined as PcOFF≧PcL in step S505 (that is, NO), it is assumed that the amount of bypass air Qb is in an excessive state, so a decrease amount correction value QDOWN is subtracted from the target amount of bypass air QbEG (the current value) (step S503), and a return to step S33A is performed.

Hereinafter, the above-mentioned steps S33A through S33D are repeatedly executed, and when the reference intake pipe pressure PcOFF does not satisfy the permission condition, addition correction processing (step S502) or subtraction correction processing (step S503) is executed in a repeated manner so that each correction value QUP or QDOWN for the target amount of bypass air QbEG is totalized.

Thus, the processes in steps S33A through S33D including the feedback correction processing routine (step S500) are repeated until it is determined as $PcL \leq PcOFF \leq PcH$ in step S33D (that is, YES).

When it is determined as $PcL \leq PcOFF \leq PcH$ in step S33D (that is, YES), the value of the target amount of bypass air QbEG at that time is stored (step S33E).

Hereinafter, similarly as described above, the control flow advances to the processing in step S104 onward, where failure detection processing is executed in steps S307 through S109.

In the above-mentioned second embodiment, the reference intake pipe pressure PcOFF in the absence of EGR with the influence of the number of revolutions per minute of the engine Ne having been corrected is calculated from the intake pipe pressure PbOFF in the absence of EGR and the correction function f based on the number of revolutions per minute of the engine NeOFF at the detection time point of the intake pipe pressure PbOFF, and when the reference intake pipe pressure PcOFF thus calculated is outside the predetermined range, the failure detection processing is interrupted.

Accordingly, when the variation of the intake pipe pressure Pb becomes large due to the above-mentioned various factors, there is a possibility of impairing or reducing the frequency of execution of failure detection.

However, according to the third embodiment of the present invention, it is determined whether the reference intake pipe pressure PcOFF in the absence of EGR with the influence thereon of the number of revolutions per minute of the engine Ne having been corrected is within the predetermined range, and when the amount of deviation with respect to the predetermined pressure state exceeds the allowable range, the control amount TISC(QbEG) of the bypass air amount control section 9 is corrected in a feedback manner by the bypass air amount control correction section in the electronic control unit 22, so that the reference intake pipe pressure PcOFF is adjusted to be within the predetermined range. As a result, the variation of the intake pipe pressure Pb due to the various factors can be compensated, thereby making it possible to prevent false detection without impairing or reducing the frequency of failure detection.

Here, the lower limit value PcL and the upper limit value PcH for permission of failure determination are set in such a manner that the amount of deviation with respect to the predetermined state of the intake pipe pressure becomes in a range allowed with respect to the false detection of an abnormal state.

In addition, the lower limit value PcL and the upper limit value PcH are set larger than the amount or rate of change of the intake pipe pressure with respect to the minimum value of the control amount of the bypass air amount control section 9, whereby hunting in the feedback correction processing of the target amount of bypass air QbEG (step S500) can be prevented, thus making it possible to enhance the convergence of the feedback correction processing.

Moreover, according to the third embodiment of the present invention, in the feedback correction processing routine (FIG. 4) of the bypass air amount control correction section, the individual correction values QUP, QDOWN of the target amount of bypass air QbEG are changed in accordance with the result of a determination as to whether the reference intake pipe pressure PcOFF is lower than the lower limit value PcL (step S501).

For example, in case where the amount of bypass air Qb is corrected to a decrease side (step S502), by setting the decrease amount correction value QDOWN to a value that is smaller than the increase correction value QUP, it is possible to suppress the occurrence of undershoot with respect to the target reference intake pipe pressure PcOFF, whereby the occurrence of engine stall due to panic braking, etc., can be avoided.

On the contrary, in case where the amount of bypass air Qb is corrected to an increase side (step S503), by setting the increase correction value QUP to a value that is larger than the decrease amount correction value ODOWN to such an extent as not to affect ensuring free running feeling or master vac pressure, it is possible to improve the ability to follow the predetermined pressure state (the failure detection condition being satisfied) while suppressing the influence on driveability.

Although in FIG. 4, the individual correction values QUP, QDOWN are switchably changed in accordance with whether the relation of PcOFF<PcL is satisfied, each of the correction values QUP, QDOWN can be set as a function based on the reference intake pipe pressure PcOFF so as to achieve further subdivided correction.

Further, a change with the lapse of time due to the various factors is corrected for the target amount of bypass air QbEG at the time point at which the reference intake pipe pressure PcOFF was corrected to become a value within the predetermined range, so it is possible to further improve the convergence to the predetermined pressure state by storing, as a learning value, the target amount of bypass air QbEG at the time when the permission condition is satisfied (step S33E), and by using the value thus stored as the initial value of the target amount of bypass air for EGR failure determination at the time of the next failure detection.

Embodiment 4

In the above-mentioned first through third embodiments (FIGS. 1 through 3), the EGR valve 12 is forced to fully open (the presence of EGR) (step S104), and the intake pipe pressure PbON at the time of introduction of EGR is read (step S205), after which, though not illustrated, in actuality, the EGR valve 12 is set to the fully closed state (the absence of EGR), as previously stated, and the control flow is then terminated.

Accordingly, the amount of deviation with respect to the predetermined state of the intake pipe pressure after the termination of the forced opening and closing of the EGR valve 12 may be checked again based on a second reference intake pipe pressure (hereinafter referred to simply as a "reference intake pipe pressure") PcOFF2 at the time point at which the EGR valve 12 is fully closed (at the time of the absence of EGR) after execution of the step S205, whereby the reliability of failure detection can be further improved.

Hereinafter, reference will be made to a fourth embodiment of the present invention while referring to a flow chart in FIG. 5 together with FIG. 8.

Figure 5:
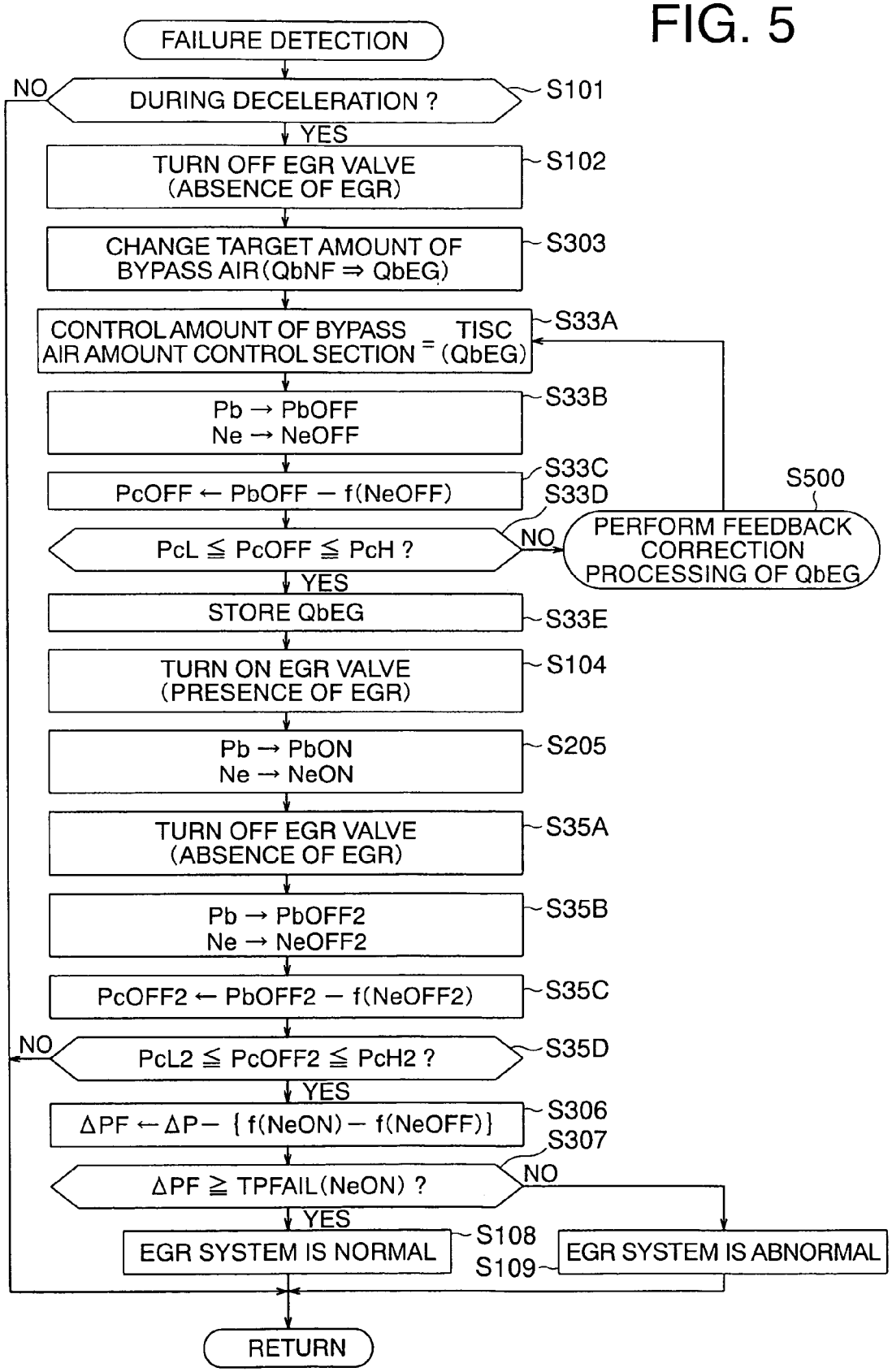
FIG. 5 is a flow chart illustrating the processing operation of a control apparatus for an internal combustion engine according to a fourth embodiment of the present invention (corresponding to claim 6).

FIG. 5 illustrates a failure detection processing operation executed in the electronic control unit 22, in which processes similar to the above-mentioned ones (see FIG. 3) are identified by the same symbols as above.

In FIG. 5, following the step S205 in FIG. 3, there are added a process of detecting a second intake pipe pressure (hereinafter referred to simply as an "intake pipe pressure") PbOFF2 in the absence of EGR (steps S35A, S35B), a process of correcting the intake pipe pressure PbOFF2 (step S35C), and a process of rechecking the permission condition based on the corrected reference intake pipe pressure PcOFF2 (steps S35A through S35D).

In this case, the electronic control unit 22 is provided with a failure determination normal termination condition detection section (steps S35A through S35D) which detects, as a failure determination normal termination condition, that the intake pipe pressure in the absence of EGR (the reference intake pipe pressure PcOFF2) at the time point at which the forced opening and closing of the EGR valve 12 was terminated is within a predetermined range based on the number of revolutions per minute of the engine Ne (i.e., PcL2≦PcOFF2≦PcH2).

In FIG. 5, after steps S101 through S205 similar to the above-mentioned ones (see FIG. 3) are executed, the EGR valve 12 is first returned to the fully closed state whereby the engine 1 is brought into a non-EGR operation state (step S35A). The intake pipe pressure Pb detected at this time is stored as the intake pipe pressure PbOFF2 in the absence of EGR at the time point at which the forced opening and closing of the EGR valve 12 has been terminated, and the number of revolutions per minute of the engine NeOFF2 at the detection time point of the intake pipe pressure PbOFF2 is also stored (step S35B).

Here, note that the processing of detecting the intake pipe pressure PbOFF2 in step S35B is executed after the intake pipe pressure Pb becomes stable (i.e., after a lapse of about one second) after the processing of forcedly closing the EGR valve 12 (non-EGR operation) (step S35A) has been executed.

Subsequently, the reference intake pipe pressure PcOFF2 in the absence of EGR with the influence of the number of revolutions per minute of the engine Ne being corrected is calculated by using the intake pipe pressure PbOFF2 in the absence of EGR stored in step S35B and the correction function f based on the number of revolutions per minute of the engine NeOFF2 at the detection time point of the intake pipe pressure PbOFF2, as shown in the following expression (7) (step S35C).

$$PcOFF2 = PbOFF2 - f(NeOFF2) \quad (7)$$

Then, a predetermined range is decided by the lower limit value PcL2 and the upper limit value PcH2 for determination of normal termination, and it is determined whether the reference intake pipe pressure PcOFF2 obtained in step S35C is within the predetermined range (i.e., PcL2≦PcOFF2≦PcH2) (step S35D).

Here, note that the lower limit value PcL2 and the upper limit value PcH2 for determination of normal termination may be set to the same values as the lower limit value PcL and the upper limit value PcH, respectively, for permission of failure determination within the step S33D.

When it is determined in step S35D that the reference intake pipe pressure PcOFF2 is outside the predetermined range (that is, NO), the normal termination condition is not satisfied, so the failure detection processing routine of FIG. 5 is terminated at once, and a return is carried out.

This is because in this case, the state of pressure is assumed to have been changed due, for example, to a brake operation, a change in the engine load, etc., from after the execution of the processing of storing the intake pipe pressure PbON in the presence of EGR and the number of revolutions per minute of the engine NeON (steps S104, S205) until when the EGR valve 12 is returned to its fully closed state thereby to bring the engine 1 into the non-EGR operation state (step S35A).

On the other hand, when it is determined as PcL2≦PcOFF2≦PcH2) in step S35D (that is, YES), the correction processing of the pressure difference ΔP (step S306) and failure determination processing (steps S307 through S109) are executed, as stated above.

Although the detected values PbOFF, NeOFF stored in step S33B are used upon calculation of the pressure difference ΔPF for failure determination in step S306, the detected values PbOFF2, NeOFF2 stored in step S35B may instead be used in place thereof.

As described above, according to the fourth embodiment of the present invention, provision is made for the failure determination normal termination condition detection section in the electronic control unit 22, and the EGR valve 12 is fully opened (step S204) so that the intake pipe pressure PbON and the number of revolutions per minute of the engine NeON in the presence of EGR are stored (step S205), whereafter the EGR valve 12 is returned to its fully closed state (step S35A) so that the intake pipe pressure PbOFF and the number of revolutions per minute of the engine NeOFF2 in the absence of EGR are stored (step S35B). Thereafter, the reference intake pipe pressure PcOFF2 in the absence of EGR with the influence thereon of the number of revolutions per minute of the engine Ne having been corrected is calculated from the intake pipe pressure PbOFF and the correction function f based on the number of revolutions per minute of the engine NeOFF2 (step S35C), and it is determined whether the reference intake pipe pressure PcOFF2 thus obtained is within the predetermined range (i.e., PcL2≦PcOFF2≦PcH2) (step S35D).

As a result, the amount of deviation with respect to the predetermined state of the intake pipe pressure is verified or checked, and when the amount of deviation exceeds the allowable range, it is assumed that there is a possibility that the state of the intake pipe pressure has been changed due to a brake operation, a change in the engine load, etc., during the execution of failure detection processing (in the EGR introduction state), so the failure detection processing is interrupted, thus preventing an incorrect or false determination.

Embodiment 5

In the above-mentioned first through fourth embodiments (FIGS. 1 through 4), deterioration in driveability due to the forced opening and closing of the EGR valve 12 is prevented by executing failure detection processing at the time of deceleration of the vehicle (during fuel cut-off operation), but no consolation has been given to the prevention of deterioration in driveability after the termination (including interruption) of the failure detection processing.

Hereinafter, reference will be made to a fifth embodiment of the present invention while referring to a flow chart in FIG. 6 together with FIG. 8.

Figure 6:
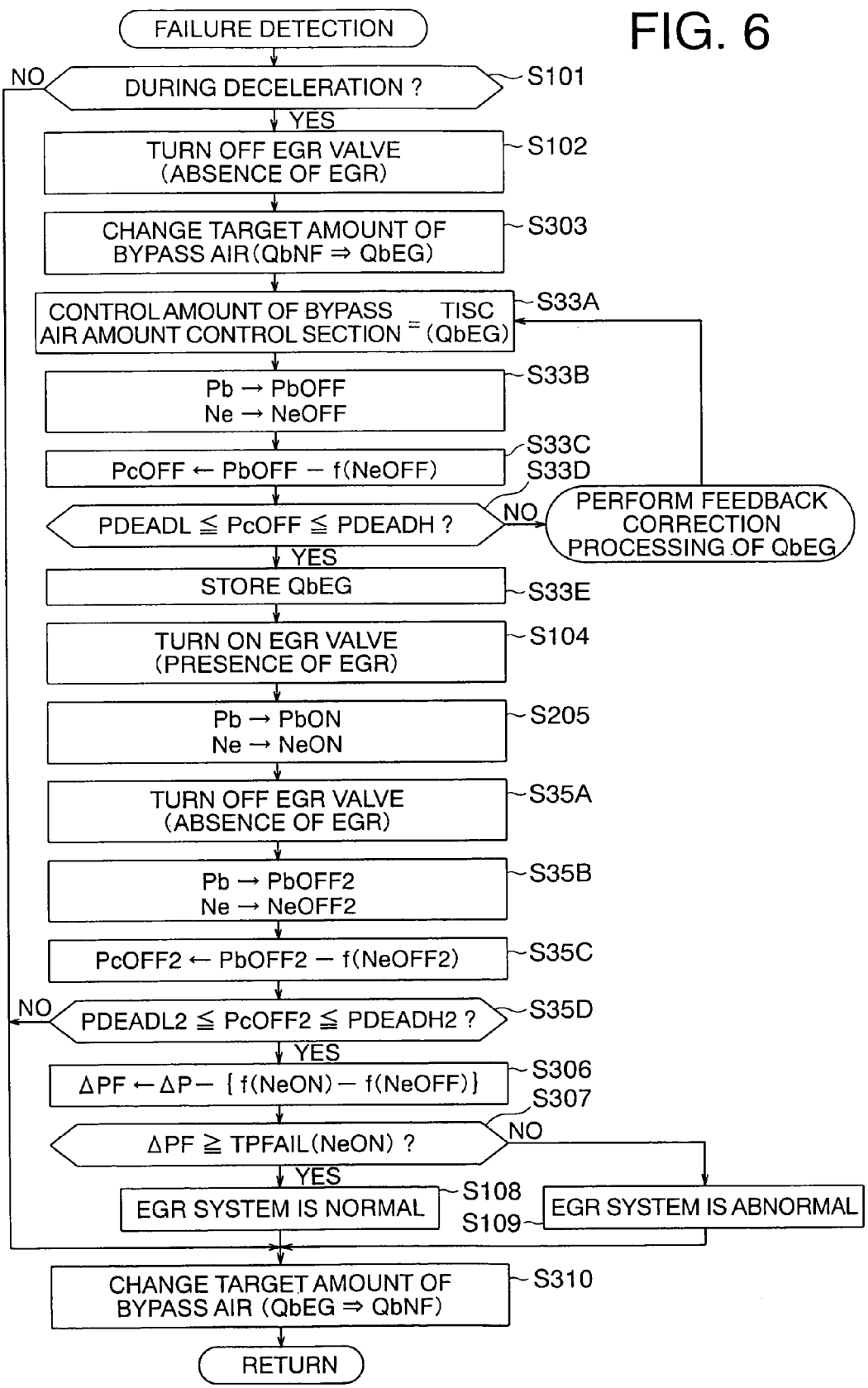
FIG. 6 is a flow chart illustrating the processing operation of a control apparatus for an internal combustion engine according to a fifth embodiment of the present invention (corresponding to claim 7).

FIG. 6 illustrates a failure detection processing operation executed in the electronic control unit 22, in which processes similar to the above-mentioned ones (see FIG. 5) are identified by the same symbols as above.

In FIG. 6, following steps S108, S109 in FIG. 5, and following the result of a negative determination (NO) in each of determination steps S101, S35D, there is added a process of changing the target amount of bypass air (step S310).

In this case, the intake pipe pressure adjustment section in the electronic control unit 22 stores, as an ordinary control amount TISC(QbEG), a control amount of the bypass air amount control section 9 before adjustment thereof by the bypass air control amount correction section, and restores the control amount of the bypass air amount control section 9 from the control amount TISC(QbEG) for failure determination to the ordinary control amount TISC(QbNF) immediately when the failure determination processing by the failure determining section has been completed or interrupted before its completion.

Here, it is assumed, though not illustrated, that when in step S303 a change is made from the target amount of bypass air QbNF calculated from the operating condition information at that time to the target amount of bypass air QbEG for EGR failure determination, the target amount of bypass air QbNF during ordinary control is stored and held.

In FIG. 6, when the failure detection processing is normally terminated (step S108), or when the failure detection processing is abnormally terminated (step S109), or when the failure detection processing is interrupted (i.e., the result of determination in each of steps S101, S35D is negative), the control flow advances to step S310.

That is, the failure detection processing of FIG. 6 is terminated after the target amount of bypass air has been changed from the target amount of bypass air QbEG for EGR failure determination to the target amount of bypass air QbNF for ordinary control (hereinafter also referred to as an ordinary control target bypass air amount QbNF).

The target amount of bypass air QbNF for ordinary control is stored and held in advance before the execution of the step S303, as previously stated.

Here, note that in step S310, when a change is made from the target amount of bypass air QbEG for EGR failure determination to the target amount of bypass air QbNF for ordinary control, such a change can be made in a gradual manner in accordance with an amount of deviation between the individual amounts of bypass air QbEG, QbNF so as to suppress a sense of discomfort (e.g., a feeling of sudden deceleration, etc.) resulting from a sudden change of the amount of bypass air Qb.

As described above, according to the fifth embodiment of the present invention, by changing the target amount of bypass air from the failure determination target bypass air amount QbEG to the ordinary control target bypass air amount QbNF when failure detection processing is normally terminated or when failure detection processing is interrupted on the way, it is possible to suppress deterioration in driveability and to avoid engine stall even if, for example, the vehicle comes out of a deceleration state (including a fuel cut-off operation) by driver's accelerator operation, panic braking, etc.

Embodiment 6

It is to be noted that the above-mentioned first through fifth embodiments can be combined with one another in an appropriate manner so as to achieve synergistic advantageous effects.

Hereinafter, reference will be made to a sixth embodiment of the present invention while referring to a flow chart in FIG. 7 together with FIG. 8 and FIGS. 1 through 6.

Figure 7:
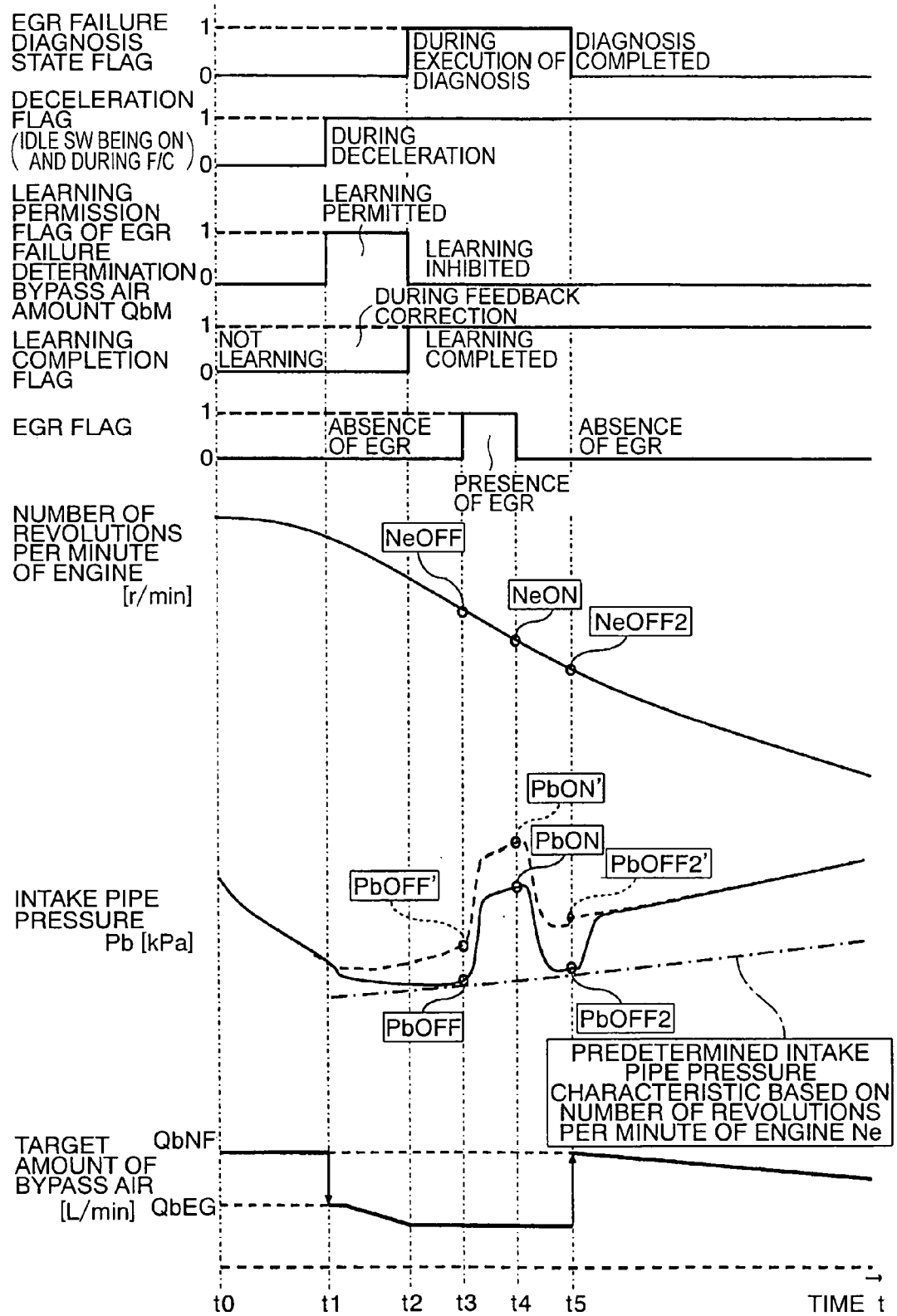
FIG. 7 is a timing chart illustrating changes over time of the number of revolutions per minute of an engine, an intake pipe pressure and a target amount of bypass air during the execution of failure detection processing according to a sixth embodiment of the present invention (corresponding to claims 1 through 7).

FIG. 7 is a timing chart that illustrates a failure detection processing (failure diagnosis) operation according to the seventh embodiment (best mode) of the present invention which is obtained by combining the above-mentioned first through fifth embodiments with one another.

In FIG. 7, there is shown a relation among an EGR failure diagnosis state flag (the state of execution of EGR failure detection processing), a deceleration flag (the idle signal I from the idle switch 18 being in an on state, and the engine 1 being in a fuel cut-off (F/C) operation), a learning permission flag and a learning completion flag for the EGR failure determination bypass air amount QbM, an EGR flag, the number of revolutions per minute of the engine Ne, the intake pipe pressure Pb, and the target amounts of bypass air QbNF, QbEG, together with their changes over time.

In FIG. 7, the characteristic of the intake pipe pressure Pb represented by a solid line shows its change over time in the sixth embodiment of the present invention, whereas the characteristic of the intake pipe pressure Pb represented by a broken line shows its change over time in a known device.

In addition, an alternate long and short dash line in the intake pipe pressure Pb shows a predetermined intake pipe pressure characteristic based on the number of revolutions per minute of the engine Ne.

First of all, in the initial state at time point t0, the target amount of bypass air is set to the ordinary control target bypass air amount QbNF.

Subsequently, when the deceleration flag holds (i.e., is set to "1") at time point t1, the target amount of bypass air is changed from the ordinary control target bypass air amount QbNF to the EGR failure determination target bypass air amount QbEG.

In addition, the target amount of bypass air ObEG is updated by feedback correction until the learning permission flag of the EGR failure determination bypass air amount QbM holds (i.e., is set to "1") at time point t1 so that the amount of deviation between the intake pipe pressure Pb (solid line) and the predetermined intake pipe pressure characteristic (alternate long and short dash line) based on the number of revolutions per minute of the engine Ne becomes within a predetermined range.

Thereafter, at time point t2 at which the amount of deviation of the intake pipe pressure Pb (solid line) and the predetermined intake pipe pressure characteristic (alternate long and short dash line) based on the number of revolutions per minute of the engine Ne becomes within the predetermined range, the feedback correction of the EGR failure determination target bypass air amount QbEG is stopped.

Also, the EGR failure determination target bypass air amount QbEG at time point t2 is stored, and the learning of the EGR failure determination bypass air amount QbM is completed.

The value of the target amount of bypass air QbEG stored at this time is used as the initial value of the EGR failure determination target bypass air amount QbEG at the next diagnosis.

Subsequently, after the learning of the EGR failure determination target bypass air amount QbEG has completed, the intake pipe pressure PbOFF and the number of revolutions per minute of the engine NeOFF in the absence of EGR at that time are stored after the intake pipe pressure Pb has become stable, i.e., at time point t3 after a lapse of about 1 second from time point t2, and the EGR valve 12 is then opened so as to put the engine 1 into an EGR operation state.

Further, after the intake pipe pressure Pb has become stable after the forced opening of the EGR valve 12, i.e., at time point t4 after a lapse of about 1 second from time point t3, the intake pipe pressure PbON and the number of revolutions per minute of the engine NeON in the presence of EGR at that time are stored, and the EGR valve 12 is closed so as to put the engine 1 into a non-EGR operation state.

Finally, after the intake pipe pressure Pb has become stable after the forced closing of the EGR valve 12 (non-EGR operation state), i.e., at time point t5 after a lapse of about 1 second from time point t4, the intake pipe pressure PbOFF2 and the number of revolutions per minute of the engine NeOFF2 in the absence of EGR at that time are stored.

In addition, the target amount of bypass air is changed from the EGR failure determination target bypass air amount QbEG to the ordinary control target bypass air amount QbNF, and the failure detection processing is terminated.

Here, note that in FIG. 7, a pressure difference ΔPf for failure determination according to the known device is calculated by using values PbOFF' (or PbOFF2'), PbON' on the characteristic curve of the intake pipe pressure Pb represented by a broken line and values NeOFF, NeON on the characteristic curve of the number of revolutions per minute of the engine Ne.

However, the characteristic curve of the intake pipe pressure Pb (broken line) according to the known device varies according to not only the engine load and the difference of the engine cooling state but also the part variations and secular changes over time of the bypass air amount control section 9 and the throttle valve 7, etc., as previously stated, so it is difficult to calculate the pressure difference ΔPf in an appropriate manner.

In contrast to this, the pressure difference ΔPF for failure determination according to the present invention is calculated by using values PbOFF (or PbOFF2), PbON on the characteristic curve of the intake pipe pressure Pb represented by a solid line, and values NeOFF, NeON on the characteristic curve of the number of revolutions per minute of the engine Ne.

At this time, the intake pipe pressure value PbOFF (or PbOFF2) can be obtained as a value along the predetermined intake pipe pressure characteristic based on the number of revolutions per minute of the engine Ne, as previously stated, so the intake pipe pressure value PbON in the presence of EGR, too, can be obtained as a definite value corresponding to the flow rate of EGR Qe.

Accordingly, the pressure difference ΔPF for failure determination according to the sixth embodiment of the present invention can be obtained with a higher degree of precision than the pressure difference ΔPf according to the known device, so it is possible to obtain a control apparatus for an internal combustion engine that is improved in the reliability of the failure determination of the EGR system.

While the invention has been described in terms of preferred embodiments, those skilled in the art will recognize that the invention can be practiced with modifications within the spirit and scope of the appended claims.

What is claimed is:

1. A control apparatus for an internal combustion engine comprising:
    a throttle valve that is opened and closed in an intake pipe for adjusting an amount of air supplied to said engine through said intake pipe;
    a bypass air amount control section that controls an amount of bypass air flowing while bypassing said throttle valve;
    an EGR tube that recirculates an exhaust gas exhausted from said engine into said intake pipe at a location downstream of said throttle valve;
    an EGR valve that adjusts a flow rate of EGR of said exhaust gas flowing through said EGR tube;
    a sensor part that detects an operating condition of said engine including an intake pipe pressure in said intake pipe and the number of revolutions per minute of said engine;
    an EGR control section that controls said EGR valve in accordance with operating condition information from said sensor part;
    a failure determination condition detection section that detects, based on said operating condition information, whether a failure determination condition for said EGR control section is satisfied;
    an EGR valve forced opening and closing section that forcedly opens and closes said EGR valve based on said operating condition information when said failure determination condition is satisfied; and
    a failure determining section that determines whether said EGR control section is in failure, by comparing a pressure change index value based on said intake pipe pressure at the time of the forced opening and closing of said EGR valve with a failure determination value;
    wherein said failure determination condition detection section includes an intake pipe pressure adjustment section that adjusts said intake pipe pressure so as to be within a predetermined range by using said bypass air amount control section; and
    said failure determination condition detection section detects, as a satisfied state of said failure determination condition, that said intake pipe pressure is within said predetermined range.

2. The control apparatus for an internal combustion engine as set forth in claim 1, wherein
    said predetermined range is calculated based on the number of revolutions per minute of said engine.

3. The control apparatus for an internal combustion engine as set forth in claim 1, further comprising a failure determination normal termination condition detection section;
    wherein said failure determination normal termination condition detection section detects, as a failure determination normal termination condition, that the intake pipe pressure at a time point at which the forced opening and closing of said EGR valve has been terminated is within said predetermined range based on the number of revolutions per minute of said engine.

4. The control apparatus for an internal combustion engine as set forth in claim 1, wherein
    said intake pipe pressure adjustment section stores, as an ordinary control amount, the control amount of said bypass air amount control section before correction thereof by said bypass air control amount correction section, and restores the control amount of said bypass air amount control section to said ordinary control amount immediately when the failure determination processing by said failure determining section has been completed or interrupted before its completion.

5. The control apparatus for an internal combustion engine as set forth in claim 1, wherein
    said intake pipe pressure adjustment section includes a bypass air control amount correction section that corrects a control amount of said bypass air amount control section based on said intake pipe pressure and the number of revolutions per minute of said engine in a feedback manner so that said intake pipe pressure becomes within said predetermined range.

6. The control apparatus for an internal combustion engine as set forth in claim 5, wherein
    said predetermined range is calculated based on said intake pipe pressure and the number of revolutions per minute of said engine; and
    said bypass air control amount correction section changes a feedback correction amount of said control amount in accordance with the polarity of an amount of deviation of said intake pipe pressure with respect to said predetermined range.

7. The control apparatus for an internal combustion engine as set forth in claim 5, wherein said bypass air control amount correction section terminates the feedback correction of said control amount upon detecting that said intake pipe pressure is within said predetermined range, and stores the control amount of said bypass air amount control section at a time point at which the state of said intake pipe pressure being within said predetermined range was detected; and said bypass air amount control section uses said control amount stored in said bypass air control amount correction section as an initial value of said control amount at the time when the next failure detection is executed.

* * * * *